US011863030B2

(12) United States Patent
Li et al.

(10) Patent No.: US 11,863,030 B2
(45) Date of Patent: Jan. 2, 2024

(54) MOTOR AND FAN

(71) Applicant: MIDEA WELLING MOTOR TECHNOLOGY (SHANGHAI) CO., LTD., Shanghai (CN)

(72) Inventors: Ping Li, Shanghai (CN); Yiming Hu, Shanghai (CN); Guyu Wu, Shanghai (CN); Di Wu, Shanghai (CN); Liming Gong, Shanghai (CN)

(73) Assignee: MIDEA WELLING MOTOR TECHNOLOGY (SHANGHAI) CO., LTD., Shanghai (CN)

(*) Notice: Subject to any disclaimer, the term of this patent is extended or adjusted under 35 U.S.C. 154(b) by 120 days.

(21) Appl. No.: 17/519,789

(22) Filed: Nov. 5, 2021

(65) Prior Publication Data

US 2022/0060096 A1 Feb. 24, 2022

Related U.S. Application Data

(63) Continuation of application No. PCT/CN2019/114156, filed on Oct. 29, 2019.

(30) Foreign Application Priority Data

Aug. 26, 2019 (CN) .......................... 201910792792.3
Aug. 26, 2019 (CN) .......................... 201910792794.2
(Continued)

(51) Int. Cl.
*H02K 16/02* (2006.01)
*H02K 1/16* (2006.01)
(Continued)

(52) U.S. Cl.
CPC ............... *H02K 16/02* (2013.01); *H02K 1/16* (2013.01); *H02K 1/182* (2013.01); *H02K 1/27* (2013.01); *H02K 7/08* (2013.01)

(58) Field of Classification Search
CPC ........ H02K 16/02; H02K 1/16; H02K 11/182; H02K 1/27; H02K 7/08
(Continued)

(56) References Cited

U.S. PATENT DOCUMENTS 6,232,690 B1 * 5/2001 Schmider ............. H02K 5/1675
310/90
2006/0113856 A1 * 6/2006 Tanno .................... H02K 21/24
310/268
(Continued)

FOREIGN PATENT DOCUMENTS

CN          1801587 A     7/2006
CN          1893225 A     1/2007
(Continued)

OTHER PUBLICATIONS

International Search Report dated May 29, 2020 received in International Application No. PCT/CN2019/114156 together with an English language translation.
(Continued)

*Primary Examiner* — Jose A Gonzalez Quinones
(74) *Attorney, Agent, or Firm* — Scully, Scott, Murphy & Presser, P.C.

(57) ABSTRACT

A motor and a fan are provided. The motor has a stator assembly, two mutually independent rotor assemblies, and two mutually independent rotating shaft assemblies. The stator assembly has a stator core and two groups of mutually independent windings. The rotor assemblies are oppositely and coaxially arranged on two axial sides of the stator assembly and form an axial air gap with the stator assembly. The two rotor assemblies are configured to rotate independently. The two mutually independent rotating shaft assemblies are coaxially connected with the two rotor assemblies, respectively, and protrude in a direction of the same side
(Continued)

away from the stator core along the axial direction of the motor.

35 Claims, 9 Drawing Sheets

(30) Foreign Application Priority Data

Aug. 26, 2019 (CN) .......................... 201921393592.2
Aug. 26, 2019 (CN) .......................... 201921394369.X

(51) Int. Cl.
  *H02K 1/18* (2006.01)
  *H02K 1/27* (2022.01)
  *H02K 7/08* (2006.01)

(58) Field of Classification Search
  USPC ...... 310/49.39, 49.42, 101, 112, 114, 156.37
  See application file for complete search history.

(56) References Cited

U.S. PATENT DOCUMENTS

| | | | |
|---|---|---|---|
| 2006/0279150 A1 | 12/2006 | Kojima et al. | |
| 2007/0001534 A1* | 1/2007 | Kojima | H02K 11/33 |
| | | | 310/268 |
| 2015/0001979 A1* | 1/2015 | Deguchi | H02K 21/24 |
| | | | 310/156.37 |

FOREIGN PATENT DOCUMENTS

| | | | | |
|---|---|---|---|---|
| CN | 101 183 822 A | | 5/2008 | |
| CN | 101183822 A | | 5/2008 | |
| CN | 102 170 206 A | | 8/2011 | |
| CN | 102170206 A | | 8/2011 | |
| CN | 101820209 B | * | 11/2012 | |
| CN | 209497375 U | | 10/2019 | |
| DE | 29824616 U1 | | 11/2001 | |
| DE | 102004022259 A1 | | 6/2005 | |
| DE | 102004008805 A1 | * | 9/2005 | .............. B63H 5/10 |
| DE | 102010040359 A1 | | 3/2012 | |
| EP | 1292004 A1 | | 3/2003 | |
| EP | 1624552 A1 | * | 2/2006 | ........... H02K 1/2793 |
| JP | 59108596 A | | 6/1984 | |
| JP | 59113751 A | | 6/1984 | |
| JP | S59-108596 A | | 6/1984 | |
| JP | 59169341 A | | 9/1984 | |
| JP | S59-169341 A | | 9/1984 | |
| JP | 2004266968 A | * | 9/2004 | |
| JP | 2004266968 A | | 9/2004 | |
| JP | 2016178829 A | * | 10/2016 | |
| WO | 2008068503 A2 | | 6/2008 | |
| WO | WO-2017186755 A1 | * | 11/2017 | |
| WO | WO-2020220621 A1 | * | 11/2020 | .............. H02K 1/146 |

OTHER PUBLICATIONS

Extended European Search Report dated May 10, 2022 received in European Patent Application No. EP 19942680.0.

* cited by examiner

MOTOR AND FAN

CROSS-REFERENCE TO RELATED APPLICATIONS

The present application is a continuation application of PCT International Application No. PCT/CN2019/114156, filed on Oct. 29, 2019, which claims the priority to and benefits of Chinese Patent application No. 201910792794.2 filed in the CNIPA on Aug. 26, 2019 and entitled "MOTOR AND FAN", Chinese Patent Application No. 201921394369.X filed in the CNIPA on Aug. 26, 2019 and entitled "MOTOR AND FAN", Chinese Patent Application No. 201910792792.3 filed in the CNIPA on Aug. 26, 2019 and entitled "MOTOR AND FAN", and Chinese Patent Application No. 201921393592.2 filed in the CNIPA on Aug. 26, 2019 and entitled "MOTOR AND FAN", the entire contents of which are herein incorporated by reference for all purposes. No new matter has been introduced.

FIELD

The present disclosure relates to the technical field of electrical fans, in particular to a motor and an electrical fan including the motor.

BACKGROUND

As life-quality of human being continuously improves, more functional requirements have been imposed on electrical fans, such as two coaxial fans using the corresponding rotation speed and steering cooperatively. The currently adopted technologies are as follows. In one of the technologies, two motors extend oppositely and axially, the two shafts are respectively connected with two fans; however, the cost is high, and the axially occupied space is large. In the other one, a single-shaft motor is matched with a gear mechanism to achieve shaft extension at both ends, and a fan connected with the two shafts rotates at a fixed proportioning rotating speed and direction; and the diversification of the functionality is limited, and the manufacture and the installation are difficult.

SUMMARY

In order to solve at least one of the above technical problems, it is an object of the present disclosure to provide a motor.

It is another object of the present disclosure to provide a fan including the motor above.

In order to achieve the above object, the technical solution of the first aspect of the present disclosure provides a motor including a stator core and two groups of mutually independent windings, a hollow channel is arranged in a radial middle part of the stator core, two axial end portions of the stator core are provided with stator teeth protruding towards two axial sides of the stator core, and the two groups of windings are wound on two groups of stator teeth respectively; two mutually independent rotor assemblies which are oppositely and coaxially arranged on two axial sides of the stator assembly and form an axial air gap with the stator assembly, wherein the two rotor assemblies are configured to rotate independently; and two mutually independent rotating shaft assemblies which are coaxially connected with the two rotor assemblies respectively and protrude in a direction of the same side away from the stator core along the axial direction of the motor, wherein parts of the two rotating shaft assemblies are arranged in the hollow channel.

According to the motor provided by the technical solution in the first aspect of the present disclosure, dual-power independent output of one motor is realized by matching one stator assembly, two mutually independent rotor assemblies and two mutually independent rotating shaft assemblies, and two fans can be driven to independently rotate at respective rotating speeds and directions without interference. Compared with the solution that the two motors are respectively connected with the two fans in a backward axial extension mode, in the present disclosure, at least one stator assembly is omitted, the axial size of the fan is reduced, and the cost of the fan is reduced. Compared with the solution that a single-shaft motor and a gear mechanism are matched to realize the shaft extension at both ends, in the present disclosure, the two fans rotate at any rotating speed and direction, the practical functionality is strong, the diversification of the fan functionality is remarkably improved, the gear mechanism is omitted, and the manufacturing and installation difficulty of products is reduced.

In particular, the electric machine comprises a stator assembly, two mutually independent rotor assemblies and two mutually independent rotating shaft assemblies. The stator assembly comprises a stator core and two groups of mutually independent windings; stator teeth are arranged at two axial ends of the stator core, and the two groups of stator teeth protrude towards both sides along the axial direction of the stator core and are wound by the two groups of windings, so that the two groups of windings can independently act on the motor; a hollow channel is arranged at a radial middle part of the stator core, providing an advantageous axial installation space for installation of the rotating shaft assemblies, so that parts of the two rotating shaft assemblies can be inserted into the hollow channel, and the axial size of the motor is further shortened. The two rotor assemblies are oppositely and coaxially arranged on two axial sides of the stator assembly, face the two groups of windings respectively, and form an axial air gap with the stator assembly, which ensures that the two rotor assemblies do not interfere with each other and have independent rotation. The two rotating shaft assemblies are independent from each other, are coaxially connected with the corresponding rotor assemblies respectively, and rotate synchronously with the corresponding rotor assemblies respectively. The two rotating shaft assemblies protrude towards the same axial side of the motor, so that one axial end of the motor can output two types of power which are not interfered with each other. Compared with the axial extension of the motor at both sides, the axial distance of the output end of the motor can be shortened. Because the two groups of windings of the stator assembly are independent from each other, the two rotor assemblies are independent from each other, and the two rotating shaft assemblies are independent from each other, the two axial ends of the motor can output two independent torques, which is equivalent to realizing the functions of the two independent motors by using one motor. Therefore, the present disclosure has the remarkable advantages of compact structure, strong practical functionality, convenient installation, small axial size and low manufacturing cost.

In addition, the motor in the above-mentioned technical solution provided by the present disclosure can also have the following additional technical features.

In the technical solution above, the rotating shaft of one of the rotating shaft assemblies is a hollow shaft, and the rotating shaft of another one of the rotating shaft assemblies extends out through the hollow shaft and is suitable for rotating relative to the hollow shaft.

The rotating shaft assembly comprises a rotating shaft, the rotating shaft of one of the rotating shaft assemblies is a hollow shaft, and the rotating shaft of another one of the rotating shaft assemblies can extend through the hollow shaft, so that the two rotating shaft assemblies protrude in the same direction, and one axial end of the motor can be simultaneously connected with two fans or other components. Further, the shaft of the other shaft assembly is a solid shaft, which is advantageous for improving the strength of the shaft. Of course, the shaft of the other shaft assembly may also be a hollow shaft.

In the technical solution above, the rotating shaft of another one of the rotating shaft assemblies comprises a connecting section and an extending section connected with the connecting section, the outer diameter of the connecting section is equal to the outer diameter of the hollow shaft, the connecting section and the hollow shaft are arranged along the axial direction of the hollow channel, and the extending section extends through the hollow shaft.

The rotating shaft of another one of the rotating shaft assemblies comprises a connecting section and an extending section, the outer diameter of the connecting section is equal to the outer diameter of the hollow shaft, the connecting section and the hollow shaft are arranged along the axial direction of the hollow channel, and the outer contour of the parts in the hollow channel after the two rotating shafts are assembled is kept flush, so that the structure of the product is more regular, it is convenient for machine-shaping the product, and the assembly is also convenient. Meanwhile, a part (i.e., the connecting section) of the rotating shaft connected with the rotor assembly is relatively thick, the strength of the rotating shaft is improved, and the reliability of the rotating shaft is favorably improved; and the two rotating shafts are conveniently supported by supporting structures such as bearings and the like of the same type, so that the reliability and the stability of the motor are improved.

In some technical solutions, the motor further comprises a shaft sleeve provided in the hollow channel, and parts of the two rotating shafts are inserted into the shaft sleeve.

A shaft sleeve is arranged in the hollow channel, one ends of the two rotating shaft assemblies are inserted into the shaft sleeve, the shaft sleeve can play a good role in limiting the two rotating shaft assemblies, the mutual interference is avoided between the two rotating shaft assemblies and the stator assembly, and it reduces the probability that the rotating shaft assemblies shake, tilt, shift and the like. Therefore, the coaxiality of the two rotating shaft assemblies is improved, and the reliability of the motor is improved. Meanwhile, the assembly precision of the rotating shaft assembly is improved, and the installation is more convenient. For example, the rotating shafts of the two rotating shaft assemblies can be nested, one end of one of the rotating shaft assemblies is inserted into the shaft sleeve, and the other end protrudes towards one axial side of the motor; one end of another one of the rotating shaft assemblies is inserted into the shaft sleeve, the other end of another one of the rotating shaft assemblies protrudes in the same axial side of the motor through the rotating shaft assembly, and the two rotating shaft assemblies are respectively coaxially connected with the two rotor assemblies and synchronously rotate with the corresponding rotor assemblies.

In any of the above technical solutions, the rotating shaft assembly comprises a rotating shaft and a rotational support, wherein the rotational support is received in the shaft sleeve and is positioned between the shaft sleeve and the rotating shaft for supporting the rotating shaft and enabling the rotating shaft to be suitable for rotating relative to the shaft sleeve, and the rotating shaft is coaxially connected with the rotor assembly.

The rotating shaft assembly comprises a rotating shaft and a rotational support, and the rotational support is received in the shaft sleeve and is positioned between the shaft sleeve and the rotating shaft, which guarantees the stability of the position of the rotating shaft and the stability in the rotating process; and the rotating shaft is coaxially connected with the rotor assembly, so that the power output function of the motor is realized.

In the above technical solution, the rotating support portion includes at least one bearing.

The rotational support comprises at least one bearing used for supporting the rotating shaft, so that the reliability of the rotating shaft can be remarkably improved. Of course, the rotational support is not limited to a bearing, and other structures are possible. For example, a plurality of roller pins are arranged on the inner side wall of the shaft sleeve along the circumferential direction, and the rotating shaft is supported by the plurality of roller pins; or a plurality of connecting rings are axially arranged on the inner side wall of the shaft sleeve, the inner side wall of each connecting ring is a smooth surface, and the rotating shaft is supported by the plurality of connecting rings.

In the technical solution above, the number of the bearings is plural, and the plurality of bearings are distributed on the same axial side of the rotor assembly at intervals along a length direction of the rotating shaft.

A plurality of bearings are arranged at intervals along the length direction of the rotating shaft, so that a plurality of parts of the rotating shaft can be supported, the supporting reliability of the rotational support to the rotating shaft is improved, and the reliability of the rotating shaft assembly is further improved; and the plurality of bearings are located on the same axial side of the corresponding rotor assembly, so that the plurality of bearings are completely received in the shaft sleeve conveniently. Therefore, the plurality of bearings are not matched with the end covers at both ends of the motor, it only needs to be concentratedly guarantee the machining precision of the shaft sleeve, and the machining precision of the end covers does not need to be guaranteed, which is beneficial to reducing the manufacturing cost. Furthermore, the number of the bearings is two. The two bearings not only can effectively improve the supporting reliability of the rotating shaft assembly, but also can be conveniently received in the shaft sleeve. The number of the parts is reduced, and the production cost is saved.

In the technical solution above, an outer side wall of the shaft sleeve is matched with the hollow channel, an inner side wall of the shaft sleeve is matched with the bearing, and the shaft sleeve is matched with the hollow channel by a concave-convex structure to limit the axial movement of the shaft sleeve relative to the stator assembly.

The outer side wall of the shaft sleeve is matched with the hollow channel, and the inner side wall of the shaft sleeve is matched with the bearing to ensure the stability of the position of the shaft sleeve; and the shaft sleeve is matched with the hollow channel by the concave-convex structure, so that the shaft sleeve can be prevented from moving axially relative to the stator assembly, and the stability of the shaft sleeve is further improved.

In the technical solution above, the concave-convex structure comprises a flange arranged on the outer side wall of the shaft sleeve and a groove arranged on the wall surface of the hollow channel; and the flange is further provided with at least one notch.

A flange is arranged on the outer side wall of the shaft sleeve, and a groove is correspondingly arranged on the wall surface of the hollow channel. When the flange is embedded into the groove during assembly, assembly positioning of the shaft sleeve can be realized, and axial movement of the shaft sleeve is limited along the stator assembly. The flange is further provided with at least one notch, and the notch can be in concave-convex fit with the casing subjected to later injection molding, so that the shaft sleeve is prevented from rotating circumferentially relative to the stator assembly, and the stability of the shaft sleeve is further improved. Further, the number of the notches is plural, and the plurality of notches are distributed at intervals along the circumferential direction of the flange.

In the technical solution above, a separation portion is provided on the inner side wall of the shaft sleeve for separating the two rotational supports at intervals.

The separation portion is arranged on the inner side wall of the shaft sleeve, and the rotational supports of the two rotating shaft assemblies can be separated at intervals by the separation portion, so that the two rotating shaft assemblies are effectively prevented from interfering with each other, and the reliability of the two rotating shaft assemblies is further improved. For example, the separation portion is a trench for installing an annular retaining ring or a baffle; and the separation portion may also be an annular protrusion or an integrally formed partition.

In any technical solution, the motor further comprises two shaft sleeve packaging covers which are fixedly connected at axial ports of the shaft sleeves for limiting the axial movement of the rotating shaft assemblies.

The shaft sleeve packaging covers are arranged at the two axial ports of the shaft sleeve, so that the axial movement of the rotational support in the shaft sleeve can be prevented, the axial movement of the two rotating shaft assemblies is limited, and the reliability of the motor is further improved. The sleeve packaging cover can be fixedly connected with the sleeve via fasteners such as screws and the like.

In other technical solutions, the rotating shaft assemblies including a rotating shaft and a rotational support, wherein the rotational support is at least partially received in the hollow channel and sleeved on the rotating shaft for supporting the rotating shaft and enabling the rotating shaft to be suitable for rotating relative to the stator core, and the two rotating shafts are coaxially connected with the two rotor assemblies respectively and protrude in a direction of the same side away from the stator core along the axial direction of the motor.

The rotating shaft assembly comprises a rotating shaft and a rotational support, wherein the rotational support is partially or completely received in the hollow channel and is sleeved on the rotating shaft, which guarantees the stability of the position of the rotating shaft and the stability in the rotating process; and the rotating shaft is coaxially connected with the rotor assembly, so that the power output function of the motor is realized.

In the above technical solution, the rotating support portion includes at least one bearing.

The rotational support comprises at least one bearing used for supporting the rotating shaft, so that the reliability of the rotating shaft can be remarkably improved. Of course, the rotational support is not limited to a bearing, and other structures are possible. For example, a plurality of roller pins are arranged on the inner side wall of the hollow channel along the circumferential direction, and the rotating shaft is supported by the plurality of roller pins; or a plurality of connecting rings are axially arranged on the inner side wall of the hollow channel, the inner side wall of each connecting ring is a smooth surface, and the rotating shaft is supported by the plurality of connecting rings.

In the technical solution above, the number of the bearings is plural, and the plurality of bearings are distributed on the two axial sides of the rotor assembly at intervals along the length direction of the rotating shaft.

A plurality of bearings are arranged at intervals along the length direction of the rotating shaft, so that a plurality of parts of the rotating shaft can be supported, the supporting reliability of the rotational support to the rotating shaft is improved, and the reliability of the rotating shaft assembly is further improved; and a plurality of bearings are distributed on the two axial sides of the corresponding rotor assembly, so that a plurality of positions of the rotating shaft can be supported dispersedly, the supporting reliability of the rotating shaft is improved, the risk that the rotating shaft inclines and the like is obviously reduced, and the using reliability of the motor is improved. Furthermore, the number of the bearings is two. The two bearings not only can effectively improve the supporting reliability of the rotating shaft assembly, but also can reduce the number of components and save the production cost.

In the technical solution above, the motor further comprises two bearing covers sleeved in the hollow channel and fixedly connected with the stator core, wherein the two bearing covers are arranged opposite to each other for respectively supporting the bearings axially inwards of the corresponding rotating shaft assemblies.

The two bearing covers are arranged in the hollow channel to support the bearings axially inwards of the two rotating shaft assemblies (i.e., the bearings relatively close to the interior of the motor). Because the two bearing covers are arranged opposite to each other, the two rotational supports can be well limited, so that the two rotating shaft assemblies and the stator assembly are not interfered with each other, and the probability that the rotating shaft assemblies shake, tilt, shift and the like is reduced; and the reliability of the motor is improved, the assembly precision of the rotating shaft assembly is improved, and the installation is more convenient. In addition, the two bearing covers can play a role of a separator, and the rotational supports of the two rotating shaft assemblies are separated at intervals, so that the two rotating shaft assemblies are effectively prevented from interfering with each other, and the reliability of the two rotating shaft assemblies is further improved.

In the technical solution above, the bearing cover is adapted to the shape of the bearing, and the bearing is received in the bearing cover and supported by the bearing cover.

The bearing covers are adapted to the forms of the bearings, so that the bearings axially inwards of the two rotating shaft assemblies can sink into the bearing covers, achieving effective support and limit, and the reliability of the motor is further improved.

In the technical solution above, an open end of the bearing cover is provided with a flanging extending radially outwards.

The open end of the bearing cover is provided with a flanging, the flanging extends radially outwards and can be in concave-convex fit with the casing subjected to later injection molding, achieving a certain limiting effect, and the bearing cover is prevented from moving axially relative to the stator core.

In the technical solution above, the flanging is provided with at least one notch.

The flanging is provided with at least one notch which can be in concave-convex fit with the casing subjected to later injection molding, so that the bearing cover is prevented from rotating circumferentially relative to the stator assembly, and the stability of the bearing cover is further improved. Further, the number of the notches is plural, and the plurality of notches are distributed at intervals along the circumferential direction of the flanging.

In any technical solution, the motor further comprises a support bearing coaxially provided between an output end portion of the hollow shaft and another one of the rotating shafts.

A support bearing is additionally arranged between an output end portion of the hollow shaft and another one of the rotating shafts, so that the support rigidity of the two rotating shaft assemblies can be further improved, and the reliability of the motor is further improved.

In any technical solution above, the two rotating shaft assemblies protrudes in the same axial side of the motor along the axial direction of the motor respectively.

The two rotating shaft assemblies respectively protrude in the same axial side of the motor along the axial direction of the motor, so that one end of the axial direction of the motor can output two powers, the two powers do not interfere with each other, and the functionality of the motor is enriched.

Of course, the two shaft assemblies may also protrude in the two axial sides of the motor along the axial direction of the motor, so that both axial ends of the motor may output two torques.

In any of the above technical solutions, the stator core comprises a stator yoke portion and a plurality of stator tooth portions arranged along the circumferential direction of the stator yoke portion, the stator core is formed by assembling the stator tooth portions and the stator yoke portion, the stator tooth portions protrude to two axial sides of the stator yoke portion to form two groups of stator teeth, and the two groups of windings are wound on the stator teeth on the two axial sides of the stator yoke portion respectively.

According to the solution, the stator core is divided into a stator yoke portion and a plurality of stator tooth portions, so that the processing difficulty of the stator core is reduced, and the winding difficulty of two groups of windings is reduced. The stator yoke portion can be formed by laminating a plurality of stator punching sheets, and the stator tooth portion can also be formed by laminating a plurality of stator punching sheets. Of course, the stator core may also be of unitary construction.

According to the technical solution above, the radial middle part of the stator yoke portion is provided with a through hole adapted to the shaft sleeve of the motor, and the through hole forms a part of the hollow channel of the stator core; and/or a radial outer side wall of the stator yoke portion is provided with a clamping slot, and a part of the stator tooth portion is embedded in the clamping slot, so that the stator tooth portion is in clamping fit with the stator yoke portion.

Due to the fact that the plurality of stator tooth portions are arranged along the circumferential direction of the stator yoke portion, a certain hollow space is enclosed by the plurality of stator tooth portions. Thus, a through hole is formed in the radial middle part of the stator yoke portion, the through hole and the hollow space form a hollow channel, which can provide an advantageous axial installation space for the rotating shaft assembly, and the axial size of the motor is shortened.

A clamping slot is formed in the radial outer side wall of the stator yoke portion, and the stator tooth portion can be clamped on the stator yoke portion by the clamping slot, so that the stator yoke portion and the stator tooth portion can be assembled. The structure is simple, and it is easy to process and assemble.

In the technical solution above, any one of the stator tooth portions comprises at least one stator tooth, the stator tooth comprises a tooth body and a tooth surface connected with one axial end of the tooth body and located on one axial side of the stator yoke portion, and all tooth surfaces of any one of the groups of the stator teeth are located in a same plane and are perpendicular to the axis of the stator yoke portion.

Any one of the stator tooth portions comprises at least one stator tooth, the stator tooth comprises a tooth body and a tooth surface, and the tooth surface is connected with an axial end, far away from the stator yoke portion, of the tooth body and is positioned on the axial side of the stator yoke portion; and all tooth surfaces of any set of stator teeth lie in the same plane and are perpendicular to the axis of the stator yoke, ensuring that an axial air gap can be formed with the rotor assembly on that side.

In the technical solution above, the stator tooth portion comprises two stator teeth, a limit step is arranged on the tooth body of the stator tooth portion and abuts against the stator yoke portion for limiting axial movement of the stator tooth portion with respect to the stator yoke portion One stator tooth portion comprises two stator teeth, the tooth surfaces of the two stator teeth are respectively positioned on two axial sides of the stator yoke portion, and an axial air gap can be formed with rotor assemblies on the two sides. Compared with the solution that one stator tooth only comprises one stator tooth, the number of the stator teeth is reduced, and the assembly process is simplified. Of course, one stator tooth may also comprise only one stator tooth, and two opposing stator tooth portions are installed at one position of the stator core to form two stator teeth.

In any technical solution above, the rotor assembly comprises a rotor disk coaxially connected with the rotating shaft assembly and a permanent magnet mounted on the rotor disk, and the rotor disk comprises a disc body exterior and a disc body interior connected with the disc body exterior from outside to inside along the radial direction of the rotor disk, wherein the disc body exterior is of a disc-shaped structure, and the disc body interior is of a disc-shaped structure or a cone-shaped structure.

The rotor assembly comprises a rotor disk and a permanent magnet, and the rotor disk serves as a mounting carrier of the permanent magnet, achieving coaxial connection between the rotor assembly and the rotating shaft assembly; the permanent magnet is mounted on the rotor disk to generate a magnetic field that interacts with the stator assembly. The disc body exterior of the rotor disk is of a disc-shaped structure, and the structure is regular, which facilitates processing and molding and arrangement of a plurality of permanent magnets; the disc body interior is of the disc-shaped structure or the conical structure, and the assembly structure of the rotor disk and the rotating shaft assembly can be reasonably designed according to the specific structure of the product, providing a favorable space for the installation of other parts.

In the technical solution above, the rotor disk is coaxially connected with the rotating shaft of the rotating shaft assembly; and the rotor disk and the rotating shaft of the rotating shaft assembly are of an integrated structure formed by injection molding or welding, or the rotor disk is in threaded connection or interference fit with the rotating shaft of the rotating shaft assembly.

The rotating shaft assembly comprises a rotating shaft, the rotor disk and the rotating shaft are coaxially connected and fixed together by injection molding or welding fabrication to form an integrated structure, or achieve a fixed connection by threaded connection, interference assembly and the like, so that the connection reliability of the rotating shaft and the rotor disk is effectively guaranteed, and the reliability of synchronous rotation of the rotating shaft and the rotor assembly is guaranteed.

In the technical solution above, the permanent magnet is of a circular or fan-shaped pie structure, the number of the permanent magnets is plural, and the plurality of permanent magnets are uniformly distributed on the axial surface of the rotor disk facing the stator yoke portion circumferentially to form axial magnetic flux; and N poles and S poles of two adjacent permanent magnets are alternately arranged or are arranged in a Halbach array.

The permanent magnets have a circular or fan-shaped pie structure, are arranged conveniently, reduce the axial size of the motor, and are uniformly distributed on a surface, facing the stator yoke portion, of the rotor disk along the circumferential direction of the rotor disk, so that axial magnetic flux is formed between the rotor assembly and the stator assembly. N poles and S poles of the two adjacent permanent magnets can be alternately arranged or can be arranged in a Halbach array, and the N poles and the S poles of the two adjacent permanent magnets can be adjusted according to product requirements.

In any technical solution, the motor further comprises: an insulating frame mounted on the stator teeth; a mounting bracket fixedly connected to the insulating frame; and a plurality of contact pins inserted to the mounting bracket, wherein lead-out wires of the two groups of windings are fixedly connected to the plurality of contact pins.

The motor further comprises an insulating frame, a mounting bracket and a plurality of contact pins, and the insulating frame is mounted on the stator teeth, which guarantees the safety and reliability of the windings mounted on the stator teeth; the mounting bracket is fixedly connected with the insulating frame, a plurality of contact pins are inserted into the mounting bracket, lead-out wires of the two groups of windings are fixedly connected to the plurality of contact pins, and accordingly the lead-out wire heads of the two groups of windings are led to a fixed and stable conductive carrier.

In the technical solution above, the mounting bracket is of an arc-shaped strip structure coaxial with the stator assembly, and the mounting bracket and the plurality of contact pins are located on the radial outer side of the rotor assembly.

The mounting bracket is of an arc-shaped strip structure coaxial with the stator assembly, and the mounting bracket and the plurality of contact pins are located on the radial outer side of the rotor assembly, so that the structure of the motor is relatively regular, the internal magnetic field of the motor is not easily interfered, and meanwhile the motor is convenient to be connected with an external circuit.

In the technical solution above, the motor further comprises a casing which is an injection molded body and fixedly connects the insulating frame, the mounting bracket, the plurality of contact pins and the shaft sleeve of the motor into a whole, wherein, an outer diameter of the casing is greater than the maximum radial outer contour surface formed by the stator assembly, the insulating frame, the mounting bracket, the plurality of contact pins; and two axial end faces of the casing comprises an inner end face and an outer end face connected with an outer edge of the inner end face, and the outer end face is located on the radial outer side of the inner end face and at least partially protrudes out of the inner end face, so that the two axial end faces of the casing form a stepped structure with high outer height and low inner height, wherein the two inner end faces are flush with the two axial end faces of the stator core or do not exceed the two axial end faces of the stator core.

The motor further comprises a casing, wherein the casing is an injection molded body for coating the insulating frame, the mounting bracket and other structures, so that the insulating frame, the mounting bracket, the plurality of contact pins and the shaft sleeve can be fixedly connected to form a whole, and the stability of the motor is guaranteed; and the outer diameter of the casing is greater than the maximum radial outer contour surface formed by the stator assembly, the insulating frame, the mounting bracket and the plurality of contact pins, so that the components are coated in the radial outer surface of the casing, and it guarantees the integrity and the regularity of the appearance of the motor and the insulation between the motor and the outside. Meanwhile, the two axial end faces of the casing are not regular planes, but are stepped structures with high outer height and low inner height, and a portion which is located radially outside and protrudes is referred to as an outer end face which is relatively small in size; and a portion recessed on the inside is referred to as an inner end face which is relatively large in size. The two inner end faces are flush with the two axial end faces of the stator core or do not exceed the two axial end faces of the stator core (i.e., the two groups of tooth surfaces of the stator core), so that the axial air gap between the tooth surfaces and the permanent magnet can be controlled more accurately and effectively.

In the technical solution above, two outer end faces of the casing are respectively provided with a circular boss coaxial with the stator assembly.

Two circular bosses are arranged on the two outer end faces of the casing and are coaxially connected with the stator assembly, so that the casing can be conveniently matched with other structures to package the motor.

In the technical solution above, a step surface is provided at a position, close to an axial end of the plurality of contact pins, of the casing, and the plurality of contact pins pass through the step surface and protrude out of the step surface along the axial direction of the stator assembly.

A step surface is arranged at a position, close to an axial end of the plurality of contact pins, of the casing, so that the plurality of contact pins pass through the step surface and protrude out of the step surface along the axial direction of the stator assembly, which can provide an advantageous space for connection or installation of the contact pins and other conductive parts. The step surface can be arranged on the inner side wall of the circular boss, so that the casing structure is further simplified.

In the technical solution above, two end packaging covers which are coaxially and fixedly mounted at the two axial ends of the casing respectively for packaging the motor and are provided with shaft holes for extending out the rotating shaft assembly.

The end packaging covers are arranged at the two axial ends of the casing, so that the integrity of the motor is guaranteed, and the internal structure of the motor is effectively protected; and the end packaging cover is provided with a shaft hole for allowing the corresponding rotating shaft to extend out, so that the power of the motor can be output. A step is formed between the outer wall surface of the circular boss and the outer wall surface of the casing, and the end packaging cover can be provided with a cover edge which is just matched with the step, so that the outer contour of the motor is regular.

In the technical solution above, an annular groove is provided in an edge position of the end packaging cover, and circular bosses at the two outer end faces of the casing are embedded into the corresponding annular grooves.

When two circular bosses are arranged on the two outer end faces of the casing, the two circular bosses are coaxially connected with the stator assembly, and an annular groove provided in an edge position of the end packaging cover, the circular bosses are embedded in the annular groove to realize the spigot fit, and the end packaging cover can be assembled in place. The structure is simple, and the assembly is convenient.

In the above technical solution, when a plurality of bearings of the rotational support of the rotating shaft assembly are distributed on the two axial sides of the rotor assembly at intervals along the length direction of the rotating shaft, the end packaging cover is provided with a bearing chamber for receiving the corresponding bearings which are axially outward of the rotating shaft assembly.

The bearing chambers are arranged on the two end packaging covers to support the bearings (i.e., the bearings relatively close to the outside of the motor) axially outward of the two rotating shaft assemblies, so that the two rotational supports can be further supported and limited, and the reliability of the two rotating shaft assemblies is further improved. In addition, the bearing chamber is integrated on the end packaging cover, so that the end packaging cover also plays a role of the bearing cover. Compared with the solution of setting additional bearing cover and then fixing it on the end packaging cover, the number of components is reduced, the assembly process is simplified, and the production cost is reduced.

For example, the middle part of the end packaging cover is firstly recessed to form a counter sink, the bottom wall of the counter sink is partially reversely protruded to form a boss, and the space defined by the boss is a bearing chamber. Further, the disc body interior of the rotor disk corresponding to the end packaging cover is constructed in a conical slope structure to fit the end packaging cover. Therefore, the inner space of the hollow channel can be reasonably utilized, and the axial size of the motor can be further reduced.

In the technical solution above, the motor further comprises an electric control plate internally arranged between the rotor assembly on any side of the motor and the end packaging cover.

Due to the arrangement of the electric control plate, automatic control of the motor is facilitated; and the electric control plate is arranged on any side of the motor and positioned between the rotor assembly on the side and the end packaging cover, so that the stability of the electric control plate is guaranteed, and the circuit output of the electric control plate is facilitated.

The technical solution of the second aspect of the present disclosure provides a fan, comprising: at least one motor according to any one of the technical solutions of the first aspect; and two fans fixedly connected with the two rotating shaft assemblies of the motor respectively, wherein the two fans rotate coaxially and independently.

Due to the fact that the fan provided by the technical solution in the second aspect of the present disclosure comprises the motor in any one of the technical solutions in the first aspect, the fan has the remarkable advantages of compact structure, strong practical functionality, convenient installation, small axial size, low manufacturing cost and the like.

Additional aspects and advantages of the present disclosure will be apparent from the following description, or may be learned by practice of the present disclosure.

BRIEF DESCRIPTION OF THE DRAWINGS

The foregoing and/or additional aspects and advantages of the present disclosure will be apparent from and elucidated with reference to the embodiments described hereinafter with reference to the accompanying drawings, in which.

Figure 1:
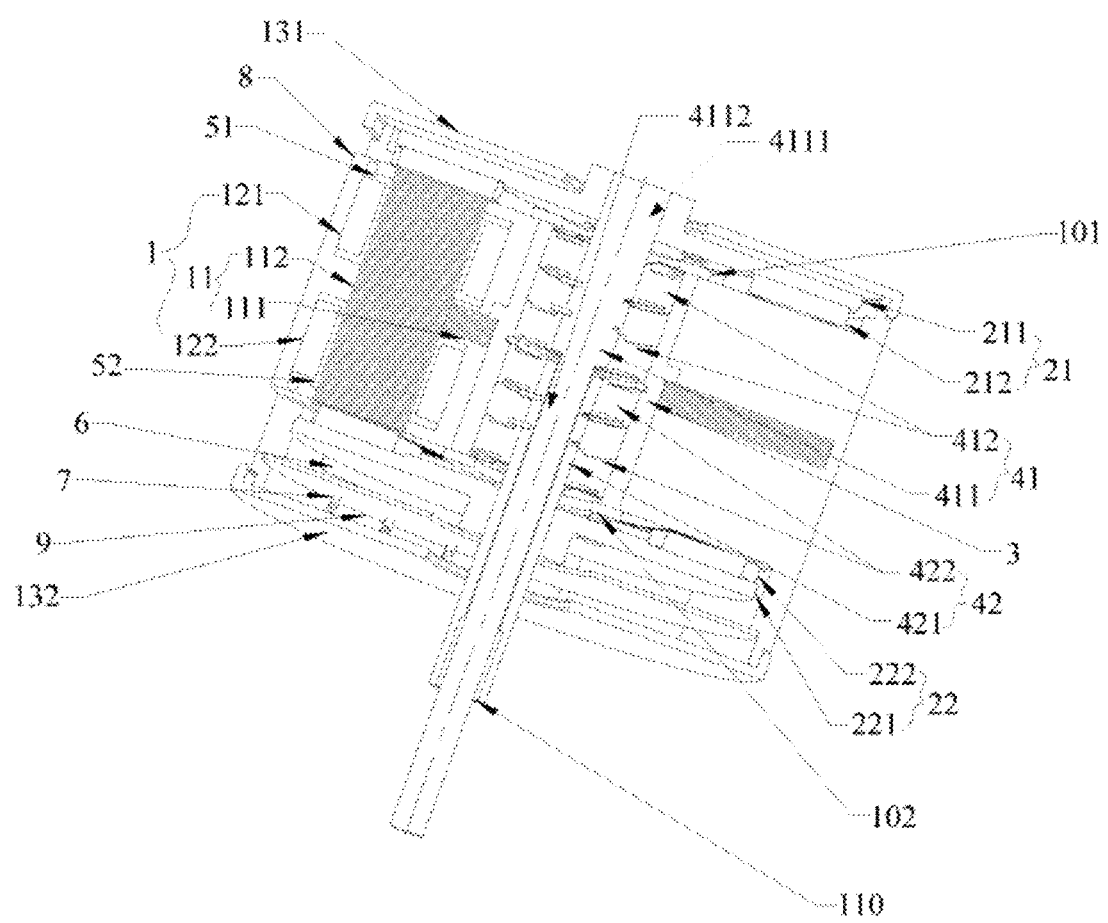
FIG. 1 is a schematic view showing a partial structure of a motor according to some embodiments of the present disclosure.

The following is description of the reference numerals in FIGS. 1-7:

100—a motor; 200—first fan; 300—second fan; 1—stator assembly; 11—stator core; 111—stator yoke portion; 1111—clamping slot; 1112—through hole; 112—stator tooth portion; 1121—tooth surface; 1122—limit step; 1123—tooth body; 121—first winding; 122—second winding;

21—first rotor assembly; 211—first rotor disk; 212—first permanent magnet; 22—second rotor assembly; 221—second rotor disk; 2211—disk body exterior; 2212—disk body interior; 222—second permanent magnet;

3—shaft sleeve; 31—outer side wall; 32 inner side wall; 33—flange; 34—notch; 35—trench;
41—first rotating shaft assembly; 411—first rotating shaft; 4111—connecting section; 4112—extending section; 412—first rotational support; 42—second rotating shaft assembly; 421—second rotating shaft; 422—second rotational support;
51—first insulating frame; 52—second insulating frame;
6—mounting bracket;
7—contact pin;
8—casing; 81—tooth wrapping surface; 82—first circular boss; 83—second circular boss; 84—step surface;
9—electric control plate;
101—first shaft sleeve packaging cover; 102—second shaft sleeve packaging cover; 110—support bearing; 131—first end packaging cover; 132—second end packaging cover.

The following is description of the reference numerals in FIGS. 8-15: 100' motor; 200' first air fan; 300' second air fan;
1' a stator assembly; 11' stator core; 111' stator yoke portion; 1111' clamping slot; 1112' through hole; 112' stator tooth; 1121' tooth surface; 1122' limit step; 1123' tooth body; 121' first winding; 122' second winding;
21' first rotor assembly; 211' first rotor disk; 212' first permanent magnet; 22' second rotor assembly; 221' second rotor disk; 2211' disk body exterior; 2212' disk body interior; 222' second permanent magnet;
31' first rotating shaft assembly; 311' first rotating shaft; 3111' connecting section; 3112' extending section; 312' first rotational support; 32' second rotating shaft assembly; 321' second rotating shaft; 322' second rotational support;
41' first bearing cover; 411' outer wall; 412' inner wall; 413' flanging; 414' notch; 42' second bearing cover;
51' first insulating frame; 52' second insulating frame;
6' mounting bracket;
7' contact pin;
8' casing; 81' tooth wrapping surface; 82' first circular boss; 83' second circular boss; 84' step surface;
9' electric control plate;
101' a first end packaging cover; 102' a second end packaging cover; 1021' bearing chamber; 1022' annular groove; and 110' support bearing.

DETAILED DESCRIPTION OF THE DISCLOSURE

In order that the above objects, features and advantages of the present disclosure may be more clearly understood, the present disclosure is described in further detail below with reference to the accompanying drawings and detailed description. It should be noted that the embodiments and the features in the embodiments herein may be combined with one another without conflict.

In the following description, numerous specific details are set forth in order to provide a thorough understanding of the present disclosure. However, the present disclosure may be practiced otherwise than as described herein. Therefore, the scope of the present disclosure is not limited to the specific embodiments disclosed below.

A motor and a fan according to some embodiments of the present disclosure are described below with reference to FIGS. 1-7.

Embodiment 1

Figure 2:
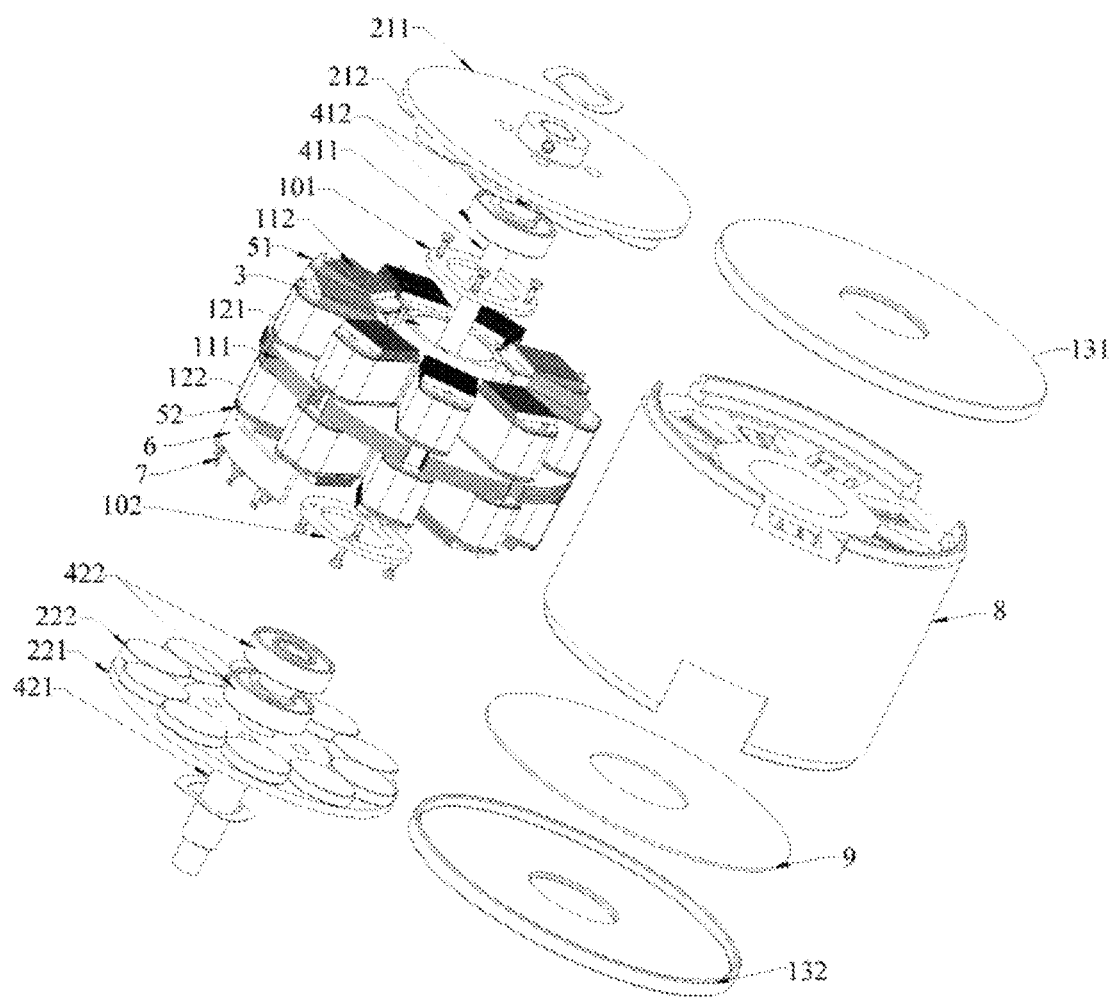
FIG. 2 is an exploded structural view of a motor according to some embodiments of the present disclosure.

As shown in FIGS. 1 and 2, an embodiment of the first aspect of the present disclosure provides a motor 100 including: a stator assembly 1, two mutually independent rotor assemblies and two mutually independent rotating shaft assemblies.

For example, the stator assembly 1 comprises a stator core 11 and two groups of mutually independent windings, as shown in FIG. 2. A hollow channel is arranged in a radial middle part of the stator core 11 (as shown in FIGS. 1, 2, 3 and 5), two axial end portions of the stator core 11 are provided with stator teeth protruding towards two axial sides of the stator core, as shown in FIG. 2, and the two groups of windings are wound on two groups of stator teeth respectively. The two mutually independent rotor assemblies are oppositely and coaxially arranged on two axial sides of the stator assembly 1 and form an axial air gap with the stator assembly 1. The two rotor assemblies are configured to rotate independently. The two mutually independent rotating shaft assemblies are coaxially connected with the two rotor assemblies respectively and protrude in a direction of the same side away from the stator core along the axial direction of the motor. Parts of the two rotating shaft assemblies are arranged in the hollow channel, as shown in FIGS. 1 and 2.

According to the motor 100 provided by the embodiment of the first aspect of the present disclosure, dual-power independent output of one motor 100 is realized by matching one stator assembly, two mutually independent rotor assemblies and two mutually independent rotating shaft assemblies, and two fans can be driven to independently rotate at respective rotating speeds and directions without interference. Compared with the solution that the two motors 100 are respectively connected with the two fans in a backward axial extension mode, in the present disclosure, at least one stator assembly 1 is omitted, the axial size of the fan is reduced, and the cost of the fan is reduced. Compared with the solution that a single-shaft motor 100 and a gear mechanism are matched to realize the shaft extension at both ends. In the present disclosure, the two fans rotate at any rotating speed and direction, the practical functionality is strong, the diversification of the fan functionality is remarkably improved, the gear mechanism is omitted, and the manufacturing and installation difficulty of products is reduced.

The electric machine 100 comprises a stator assembly 1, two mutually independent rotor assemblies and two mutually independent rotating shaft assemblies. The stator assembly 1 comprises a stator core 11 and two groups of mutually independent windings. Stator teeth are arranged at two axial ends of the stator core 11, and the two groups of stator teeth protrude towards both sides along the axial direction of the stator core 11 and are wound by the two groups of windings, so that the two groups of windings can independently act on the motor 100. A hollow channel is arranged at a radial middle part of the stator core 11, providing an advantageous axial installation space for installation of the rotating shaft assemblies, so that parts of the two rotating shaft assemblies can be inserted into the hollow channel, and the axial size of the motor 100 is further shortened. The two rotor assemblies are oppositely and coaxially arranged on two axial sides of the stator assembly 1, facing the two groups of windings respectively and forming an axial air gap with the stator assembly 1, which ensures that the two rotor assemblies do not interfere with each other and have independent rotation. The two rotating shaft assemblies are independent from each other, are coaxially connected with the corresponding rotor assemblies respectively, and rotate synchronously with the corresponding rotor assemblies respectively. The two rotating shaft assemblies protrude towards the same axial side of the motor 100, so that one axial end of the motor 100 can output two types of power which are not interfered with each other. Compared with the axial extension of the motor 100 at both sides, the axial distance of the output end of the motor 100 can be shortened. Because the two groups of windings of the stator assembly 1 are independent from each other, the two rotor assemblies are independent from each other, and the two rotating shaft assemblies are independent from each other, the two axial ends of the motor 100 can output two independent torques, which is equivalent to realizing the functions of the two independent motors 100 by using one motor 100. Therefore, the present disclosure has the remarkable advantages of compact structure, strong practical functionality, convenient installation, small axial size and low manufacturing cost.

The two rotor assemblies may be referred to as a first rotor assembly 21 and a second rotor assembly 22, respectively, the shaft assembly connected to the first rotor assembly 21 being referred to as a first rotating shaft assembly 41, the shaft assembly connected to the second rotor assembly 22 being referred to as a second rotating shaft assembly 42, the winding cooperating with the first rotor assembly 21 being referred to as a first winding 121, and the winding cooperating with the second rotor assembly 22 being referred to as a second winding 122.

The rotating shaft assembly comprises a rotating shaft, wherein the rotating shaft of one of the rotating shaft assemblies is a hollow shaft, as shown in FIG. 1, and the rotating shaft of the other one of the rotating shaft assemblies extends out through the hollow shaft, as shown in FIGS. 1 and 2, and is suitable for rotating relative to the hollow shaft.

The rotating shaft assembly comprises a rotating shaft, the rotating shaft of one of the rotating shaft assemblies is a hollow shaft, and the rotating shaft of the other one of the rotating shaft assemblies can extend through the hollow shaft, so that the two rotating shaft assemblies protrude in the same direction, and one axial end of the motor 100 can be simultaneously connected with two fans or other components. Further, the shaft of the other shaft assembly is a solid shaft, which is advantageous for improving the strength of the shaft. Of course, the shaft of the other shaft assembly may also be a hollow shaft.

The rotating shaft assembly in which the rotating shaft is a hollow shaft is referred to as the second rotating shaft assembly 42, the rotating shaft of the second rotating shaft assembly 42 is referred to as the second rotating shaft 421, and the rotating shaft of the first rotating shaft assembly 41 is referred to as the first rotating shaft 411. For example, the first rotating shaft 411 is a solid shaft, as shown in FIG. 1.

Further, the rotating shaft of another one of the rotating shaft assemblies (i.e., the first rotating shaft assembly 41) includes a connecting section 4111 and an extending section 4112 connected to the connecting section 4111. As shown in FIG. 1, the outer diameter of the connecting section 4111 is equal to the outer diameter of the hollow shaft, the connecting section 4111 and the hollow shaft are arranged along the axial direction of the hollow channel, and the extending section 4112 protrudes through the hollow shaft.

The rotating shaft of another one of the rotating shaft assemblies comprises a connecting section 4111 and an extending section 4112, the outer diameter of the connecting section 4111 is equal to the outer diameter of the hollow shaft, the connecting section 4111 and the hollow shaft are arranged along the axial direction of the hollow channel, and the outer contour of the parts in the hollow channel after the two rotating shafts are assembled is kept flush, so that the structure of the product is more regular, it is convenient for machine-shaping the product, and the assembly is also convenient. Meanwhile, a part (i.e., the connecting section 4111) of the rotating shaft connected with the rotor assembly is relatively thick, the strength of the rotating shaft is improved, and the reliability of the rotating shaft is favorably improved; and the two rotating shafts are conveniently supported by supporting structures such as bearings and the like of the same type, so that the reliability and the stability of the motor 100 are improved.

Further, as shown in FIGS. 1, 2, 4 and 5, the motor 100 further comprises a shaft sleeve 3 provided in the hollow channel, and parts of the two rotating shaft assemblies are inserted into the shaft sleeve 3.

A shaft sleeve is arranged in the hollow channel 3, ends of the two rotating shaft assemblies, at the same side of the rotating shaft assemblies, are inserted into the shaft sleeve 3, the shaft sleeve 3 can play a good role in limiting the two rotating shaft assemblies, the mutual interference is avoided between the two rotating shaft assemblies and the stator assembly, and it reduces the probability that the rotating shaft assemblies shake, tilt, shift and the like. Therefore, the coaxiality of the two rotating shaft assemblies is improved, and the reliability of the motor 100 is improved. Meanwhile, the assembly precision of the rotating shaft assembly is improved, and the installation is more convenient.

For example, the rotating shafts of the two rotating shaft assemblies can be nested, the first rotating shaft assembly 41 is inserted into the shaft sleeve 3, and the other end protrudes towards one axial side of the motor 100. The second rotating shaft assembly 42 is inserted into the shaft sleeve 3, the other end of another one of the rotating shaft assemblies protrudes in the same axial side of the motor 100 through the rotating shaft assembly, and the two rotating shaft assemblies are respectively coaxially connected with the two rotor assemblies and synchronously rotate with the corresponding rotor assemblies.

Further, as shown in FIG. 1, the motor 100 further comprises a support bearing 110 coaxially provided between an output end of the hollow shaft and another one of the rotating shafts.

The support bearing 110 is additionally arranged between an output end portion of the hollow shaft and another one of the rotating shafts, so that the support rigidity of the two rotating shaft assemblies can be further improved, and the reliability of the motor 100 is further improved.

Figure 3:
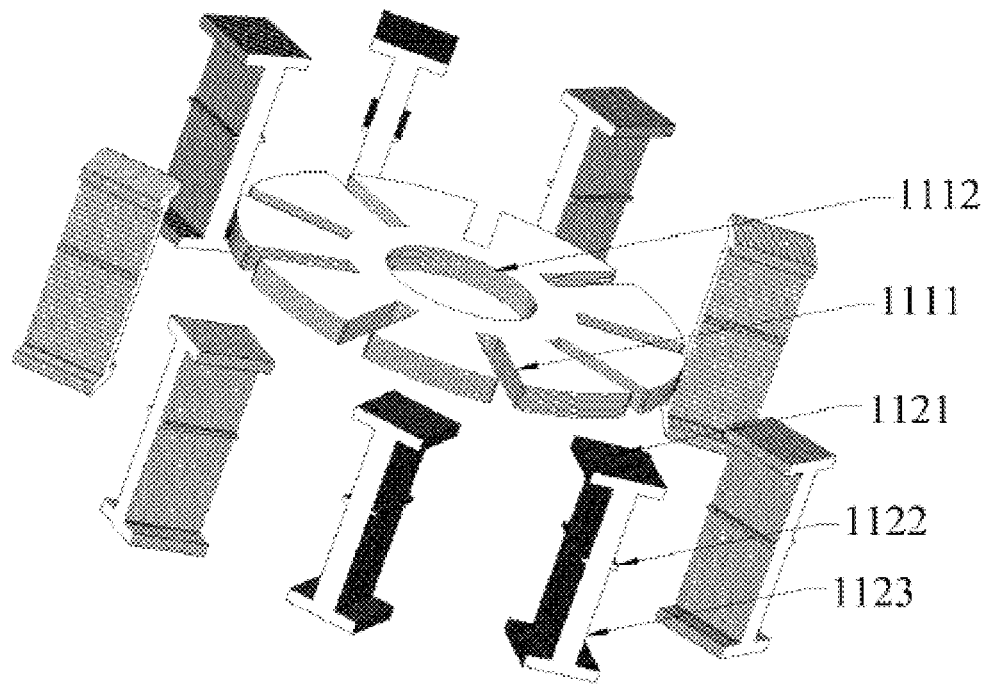
FIG. 3 is a schematic view showing a structure of a stator assembly according to some embodiments of the present disclosure.

Further, the stator core 11 comprises a stator yoke portion 111 and a plurality of stator tooth portions 112 arranged along the circumferential direction of the stator yoke portion 111. As shown in FIG. 3, the stator core 11 is formed by assembling the stator tooth portions 112 and the stator yoke portion 111, the stator tooth portions 112 protrude to two axial sides of the stator yoke portion 111 to form two groups of stator teeth, and the two groups of windings are wound on the stator teeth on the two axial sides of the stator yoke portion 111 respectively.

According to the solution, the stator core 11 is divided into a stator yoke portion 111 and a plurality of stator tooth portions 112, so that the processing difficulty of the stator core 11 is reduced, and the winding difficulty of two groups of windings is reduced. The stator yoke portion 111 can be formed by laminating a plurality of stator punching sheets, and the stator tooth portion 112 can also be formed by laminating a plurality of stator punching sheets. Of course, the stator core 11 may also be of unitary construction.

Further, the radial middle part of the stator yoke portion 111 is provided with a through hole 1112 adapted to the shaft sleeve 3 of the motor 100, and as shown in FIG. 3, the through hole 1112 constitutes a part of the hollow channel of the stator core 11.

Due to the fact that the plurality of stator tooth portions 112 are arranged along the circumferential direction of the stator yoke portion 111, a certain hollow space is enclosed by the plurality of stator tooth portions 112. Thus, a through hole 1112 is formed in the radial middle part of the stator yoke portion 111, the through hole 1112 and the hollow space form a hollow channel, which can provide an advantageous axial installation space for the rotating shaft assembly, and the axial size of the motor 100 is shortened.

Further, a radial outer side wall of the stator yoke portion 111 is provided with a clamping slot 1111, and as shown in FIG. 3, a part of the stator tooth portion 112 is embedded into the clamping slot 1111, so that the stator tooth portion 112 is in clamping fit with the stator yoke portion 111.

A clamping slot 1111 is formed in the radial outer side wall of the stator yoke portion 111, and the stator tooth portion 112 can be clamped on the stator yoke portion by the clamping slot 1111, so that the stator yoke portion 111 and the stator tooth portion 112 can be assembled. The structure is simple, and it is easy to process and assemble.

Any one of the stator tooth portions 112 comprises at least one stator tooth, the stator tooth comprises a tooth body 1123 and a tooth surface 1121 connected with one axial end of the tooth body 1123 and located on one axial side of the stator yoke portion 111, and all tooth surfaces 1121 of any one of the groups of stator teeth are located in a same plane and are perpendicular to the axis of the stator yoke portion 111.

Any one of the stator tooth portions 112 comprises at least one stator tooth, the stator tooth comprises a tooth body 1123 and a tooth surface 1121, and the tooth surface 1121 is connected with an axial end, far away from the stator yoke portion 111, of the tooth body 1123 and is positioned on the axial side of the stator yoke portion 111; and all tooth surfaces 1121 of any set of stator teeth lie in the same plane and are perpendicular to the axis of the stator yoke portion 111, ensuring that an axial air gap can be formed with the rotor assembly on that side.

Further, the stator tooth portion 112 comprises two stator teeth, and a limit step 1122 is arranged on the tooth body 1123 of the stator tooth portion 112 and abuts against the stator yoke portion 111 for limiting axial movement of the stator tooth portion 112 with respect to the stator yoke portion 111, as shown in FIG. 3.

One stator tooth portion 112 comprises two stator teeth, the tooth surfaces 1121 of the two stator teeth are respectively positioned on two axial sides of the stator yoke portion 111, and an axial air gap can be formed with rotor assemblies on the two sides. Compared with the solution that one stator tooth 112 only comprises one stator tooth, the number of the stator teeth 112 is reduced, and the assembly process is simplified. Of course, one stator tooth 112 may also comprises only one stator tooth, and two opposing stator tooth portions 112 are installed at one position of the stator core 11 to form two stator teeth.

Embodiment 2

Figure 6:
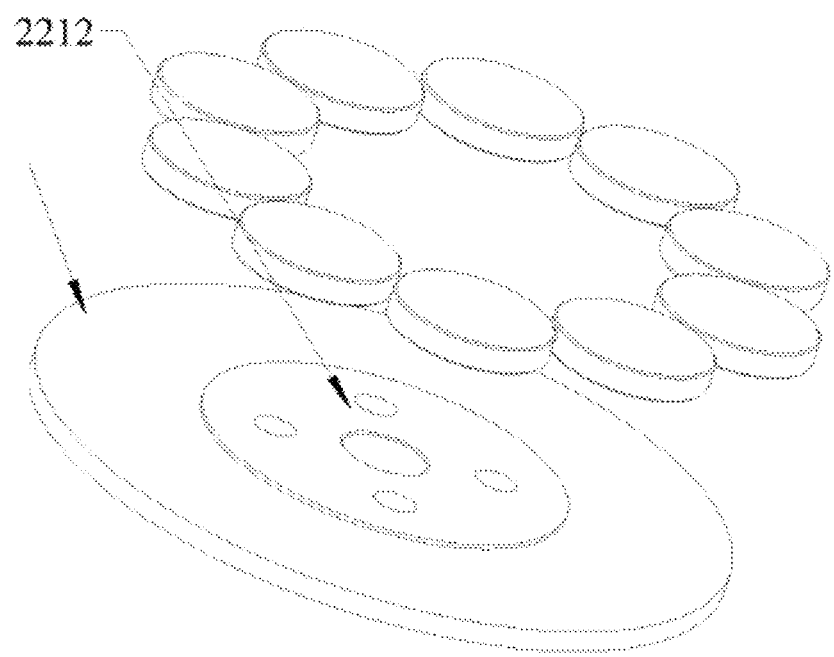
FIG. 6 is an exploded structural view of a rotor according to some embodiments of the present disclosure.

The difference from Embodiment 1 is as follows: on the basis of Embodiment 1, further, as shown in FIG. 6, the rotor assembly comprises a rotor disk coaxially connected with the rotating shaft assembly and a permanent magnet mounted on the rotor disk, and the rotor disk comprises a disk body exterior 2211 and a disk body interior 2212 connected with the disk body exterior 2211 from outside to inside in a radial direction of the rotor disk, wherein the disk body exterior 2211 is of a disk-shaped structure, and the disk body interior 2212 is of a disk-shaped structure or a cone-shaped structure.

The rotor assembly comprises a rotor disk and a permanent magnet, and the rotor disk serves as a mounting carrier of the permanent magnet, achieving coaxial connection between the rotor assembly and the rotating shaft assembly; the permanent magnet is mounted on the rotor disk to generate a magnetic field that interacts with the stator assembly 1. The disc body exterior of the rotor disk 2211 is of a disc-shaped structure, and the structure is regular, which facilitates processing and molding and arrangement of a plurality of permanent magnets; and the disc body exterior 2212 is of the disc-shaped structure or the conical structure, and the assembly structure of the rotor disk and the rotating shaft assembly can be reasonably designed according to the specific structure of the product, providing a favorable space for the installation of other parts.

For example, the rotor disk and permanent magnet of the first rotor assembly 21 are referred to as a first rotor disk 211 and a first permanent magnet 212, respectively, and the rotor disk and permanent magnet of the second rotor assembly 22 are referred to as a second rotor disk 221 and a second permanent magnet 222, respectively.

Further, the rotating shaft assembly comprises a rotating shaft, and the rotor disk is coaxially connected with the rotating shaft.

The rotor disk and the rotating shaft are of an integrated structure formed by injection molding.

Alternatively, the rotor disk and the rotating shaft are of an integrated structure formed by welding.

Alternatively, the rotor disk is threadably connected with the rotating shaft.

Alternatively, the rotor disk is in interference fit with the rotating shaft.

The rotating shaft assembly comprises a rotating shaft, the rotor disk and the rotating shaft are coaxially connected and fixed together by injection molding or welding fabrication to form an integrated structure, or achieve a fixed connection by threaded connection, interference assembly and the like, so that the connection reliability of the rotating shaft and the rotor disk is effectively guaranteed, and the reliability of synchronous rotation of the rotating shaft and the rotor assembly is guaranteed. Of course, the rotating shaft may be fixedly connected with the rotor disk in other ways, such as by fasteners, etc.

For example, the permanent magnet is of a circular or fan-shaped pie structure, the number of the permanent magnets is plural, and the plurality of permanent magnets are uniformly distributed on the axial surface of the rotor disk facing the stator yoke portion 111 circumferentially to form axial magnetic flux; and N poles and S poles of two adjacent permanent magnets are alternately arranged or are arranged in a Halbach array.

The permanent magnets have a circular or fan-shaped pie structure, are arranged conveniently, reduce the axial size of the motor 100, and are uniformly distributed on a surface, facing the stator yoke portion 111, of the rotor disk along the circumferential direction of the rotor disk, so that axial magnetic flux is formed between the rotor assembly and the stator assembly 1. N poles and S poles of the two adjacent permanent magnets can be alternately arranged or can be arranged in a Halbach array, and the N poles and the S poles of the two adjacent permanent magnets can be specifically adjusted according to product requirements.

Embodiment 3

The difference from Embodiment 2 is as follows: on the basis of Embodiment 2, the rotating shaft assembly comprises a rotating shaft and a rotational support, wherein the rotational support is received in the shaft sleeve 3 and is positioned between the shaft sleeve 3 and the rotating shaft for supporting the rotating shaft and enabling the rotating shaft to be suitable for rotating relative to the shaft sleeve 3, and the rotating shaft is coaxially connected with the rotor assembly.

The rotating shaft assembly comprises a rotating shaft and a rotational support, and the rotational support is received in the shaft sleeve 3 and is positioned between the shaft sleeve 3 and the rotating shaft, which guarantees the stability of the position of the rotating shaft and the stability in the rotating process; and the rotating shaft is coaxially connected with the rotor assembly, so that the power output function of the motor 100 is realized.

For example, the rotating shaft and the rotational support of the first rotating shaft assembly 41 are respectively referred to as a first rotating shaft 411 and a first rotational support 412, and the rotating shaft and the rotational support of the second rotating shaft assembly 42 are respectively referred to as a second rotating shaft 421 and a second rotational support 422.

The rotating support comprises at least one bearing, as shown in FIGS. 1 and 2.

The rotational support comprises at least one bearing used for supporting the rotating shaft, so that the reliability of the rotating shaft can be remarkably improved. Of course, the rotational support is not limited to a bearing, and other structures are possible. For example, a plurality of roller pins are arranged on the inner side wall 32 of the shaft sleeve 3 along the circumferential direction, and the rotating shaft is supported by the plurality of roller pins; or a plurality of connecting rings are axially arranged on the inner side wall 32 of the shaft sleeve 3, the inner side wall of each connecting ring is a smooth surface, and the rotating shaft is supported by the plurality of connecting rings.

For example, the number of bearings is plural, and the plurality of bearings are distributed on the same axial side of the rotor assembly at intervals along the length direction of the rotating shaft, as shown in FIGS. 1 and 2.

A plurality of bearings are arranged at intervals along the length direction of the rotating shaft, so that a plurality of parts of the rotating shaft can be supported, the supporting reliability of the rotational support to the rotating shaft is improved, and the reliability of the rotating shaft assembly is further improved; and the plurality of bearings are located on the same axial side of the corresponding rotor assembly, so that the plurality of bearings are completely received in the shaft sleeve 3 conveniently. Therefore, the plurality of bearings are not matched with the end covers at both ends of the motor. As a result, efforts can be focused only on ensuring the machining precision of the shaft sleeve 3, and the machining precision of the end covers does not need to be guaranteed, which is beneficial to reducing the manufacturing cost. Furthermore, the number of the bearings is two. The two bearings not only can effectively improve the supporting reliability of the rotating shaft assembly, but also can be conveniently received in the shaft sleeve 3. The number of the parts is reduced, and the production cost is saved.

Further, an outer side wall 31 of the shaft sleeve 3 is matched with the hollow channel, an inner side wall 32 of the shaft sleeve 3 is matched with the bearing, and the shaft sleeve 3 is matched with the hollow channel by a concave-convex structure to limit the axial movement of the shaft sleeve 3 relative to the stator assembly.

The outer side wall 31 of the shaft sleeve 3 is matched with the hollow channel, and the inner side wall 32 of the shaft sleeve 3 is matched with the bearing to ensure the stability of the position of the shaft sleeve 3; and the shaft sleeve 3 is matched with the hollow channel by the concave-convex structure, so that the shaft sleeve 3 can be prevented from moving axially relative to the stator assembly 1, and the stability of the shaft sleeve 3 is further improved.

Figure 4:
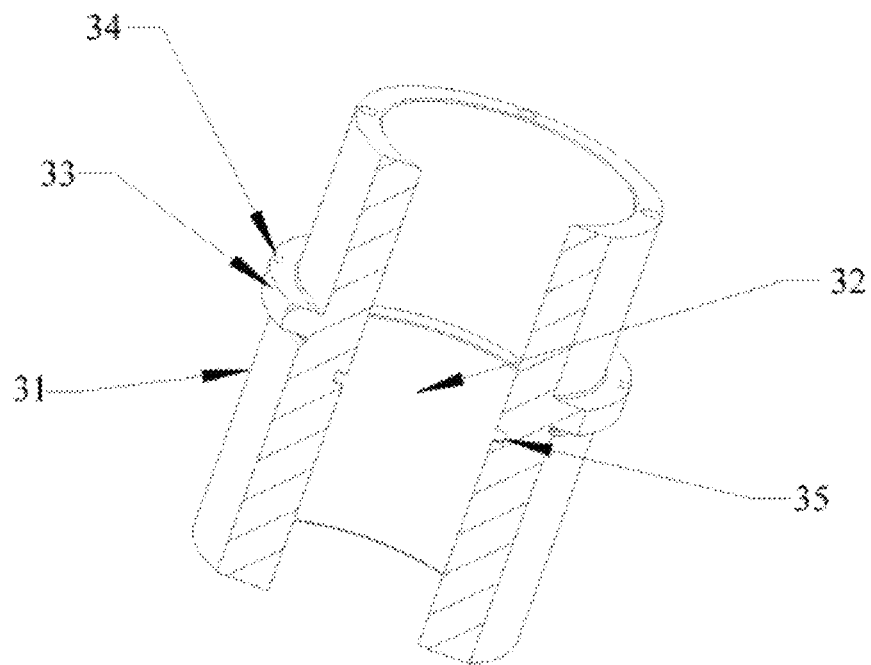
FIG. 4 is a schematic view showing a partial structure of a shaft sleeve according to some embodiments of the present disclosure.

For example, the concave-convex structure comprises a flange 33 (see FIG. 4) arranged on the outer side wall 31 of the shaft sleeve 3 and a groove arranged on the wall surface of the hollow channel; wherein, the flange 33 is further provided with at least one notch 34, as shown in FIG. 4.

The flange 33 is arranged on the outer side wall 31 of the shaft sleeve 3, and a groove is correspondingly arranged on the wall surface of the hollow channel. When the flange 33 is embedded into the groove during assembly, assembly positioning of the shaft sleeve 3 can be realized, and the axial movement of the shaft sleeve 3 is limited along the stator assembly 1. The flange 33 is further provided with at least one notch 34, and the notch 34 can be in concave-convex fit with the casing subjected to later injection molding, so that the shaft sleeve 3 is prevented from rotating circumferentially relative to the stator assembly 1, and the stability of the shaft sleeve 3 is further improved. Further, the number of the notches 34 is plural, and the plurality of the notches 34 are distributed at intervals along the circumferential direction of the flange 33.

Further, a separation portion is provided on the inner side wall 32 of the shaft sleeve 3 for separating the two rotational supports at intervals.

The separation portion is arranged on the inner side wall 32 of the shaft sleeve 3, and the rotational supports of the two rotating shaft assemblies can be separated at intervals by the separation portion, so that the two rotating shaft assemblies are effectively prevented from interfering with each other, and the reliability of the two rotating shaft assemblies is further improved.

For example, the separation portion is a trench 35 (shown in FIG. 4) for installing an annular retaining ring or a baffle; and the separation portion may also be an annular protrusion or an integrally formed partition.

Embodiment 4

The difference from Embodiment 3 is as follows: on the basis of Embodiment 3, the motor 100 further comprises an insulating frame, a mounting bracket 6 and a plurality of pins 7, as shown in FIGS. 1 and 2.

For example, the insulating frame is mounted on the stator teeth; the mounting bracket 6 is fixedly connected to the insulating frame; a plurality of contact pins 7 are inserted to the mounting bracket 6, wherein lead-out wires of the two groups of windings are fixedly connected to the plurality of contact pins 7.

The motor 100 further comprises an insulating frame, a mounting bracket 6 and a plurality of contact pins 7, and the insulating frame is mounted on the stator teeth, which guarantees the safety and reliability of the windings mounted on the stator teeth. The mounting bracket 6 is fixedly connected with the insulating frame, a plurality of contact pins 7 are inserted into the mounting bracket, lead-out wires of the two groups of windings are fixedly connected to the plurality of contact pins 7, and accordingly the lead-out wire heads of the two groups of windings are led to a fixed and stable conductive carrier.

The number of the insulating frames is two or two groups, the two or two groups of the insulating frames are respectively mounted on two groups of stator teeth and are respectively referred to as a first insulating frame 51 and a second insulating frame 52, and the mounting bracket 6 is fixedly connected with one of the insulating frames.

Figure 5:
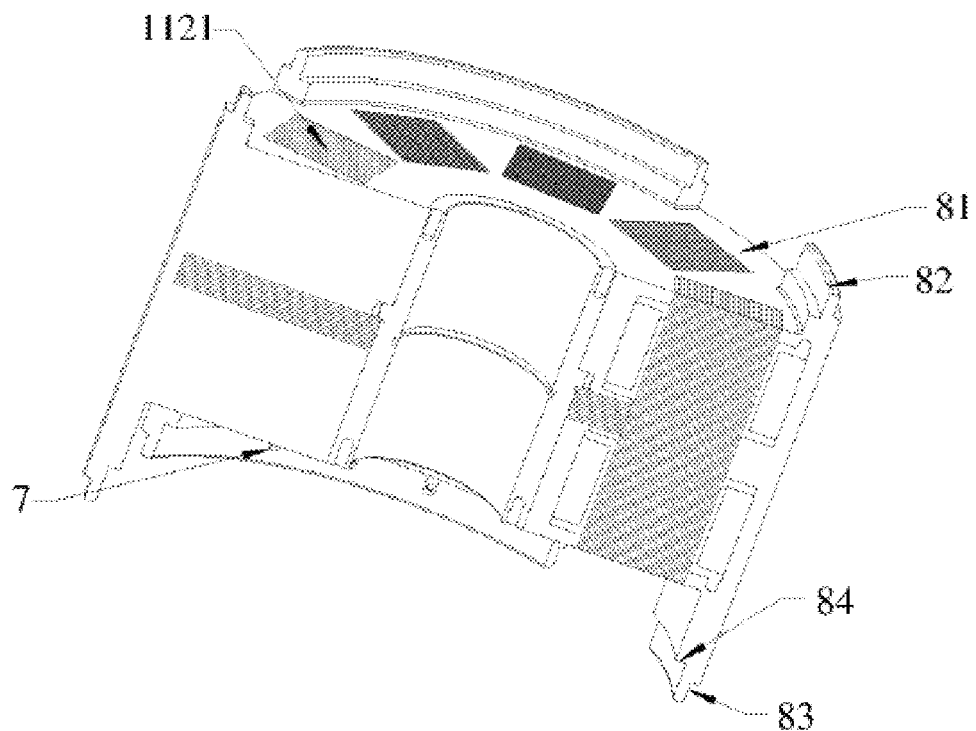
FIG. 5 is a schematic view showing a partial structure of a motor according to some embodiments of the present disclosure.

For example, the mounting bracket 6 is of an arc-shaped strip structure coaxial with the stator assembly 1, and the mounting bracket 6 and the plurality of contact pins 7 are located on the radial outer side of the rotor assembly, as shown in FIG. 5.

The mounting bracket 6 is of an arc-shaped strip structure coaxial with the stator assembly 1, and the mounting bracket 6 and the plurality of contact pins 7 are located on the radial outer side of the rotor assembly, so that the structure of the motor 100 is relatively regular, the internal magnetic field of the motor 100 cannot be easily interfered, and meanwhile the motor is convenient to be connected with an external circuit.

Further, the motor 100 further comprises a casing 8, as shown in FIG. 2, which is an injection molded body and fixedly connects the insulating frame, the mounting bracket 6, the plurality of contact pins 7 and the shaft sleeve 3 to one another to provide an integrated structure, as shown in FIG. 2, wherein, an outer diameter of the casing 8 is greater than the maximum radial outer contour surface formed by the stator assembly 1, the insulating frame, the mounting bracket 6, the plurality of contact pins 7; and two axial end faces of the casing 8 comprises an inner end face and an outer end face connected with an outer edge of the inner end face, and the outer end face is located on the radial outer side of the inner end face and at least partially protrudes out of the inner end face, so that the two axial end faces of the casing 8 form a stepped structure with high outer height and low inner height, wherein the two inner end faces are flush with the two axial end faces of the stator core 11 or do not exceed the two axial end faces of the stator core 11.

The motor 100 further comprises a casing 8, wherein the casing is an injection molded body for coating the insulating frame, the mounting bracket 6 and other structures, so that the insulating frame, the mounting bracket 6, the plurality of contact pins 7 and the shaft sleeve 3 can be fixedly connected to form a whole, and the stability of the motor 100 is guaranteed; and the outer diameter of the casing 8 is greater than the maximum radial outer contour surface formed by the stator assembly 1, the insulating frame, the mounting bracket 6 and the plurality of contact pins 7, so that the components are coated in the radial outer surface of the casing 8, and it guarantees the integrity and the regularity of the appearance of the motor 100 and the insulation between the motor and the outside. Meanwhile, the two axial end faces (which can also be called tooth wrapping surfaces 81) of the casing 8 are not regular planes, but are stepped structures with high outer height and low inner height and low outside, as shown in FIGS. 2 and 5, and a portion which is located radially outside and protrudes is referred to as an outer end face which is relatively small in size; and a portion recessed on the inside is referred to as an inner end face which is relatively large in size, as shown in FIGS. 2 and 5.

The two inner end faces (i.e., the two axial end faces on the radial inner side of the casing 8) are flush with the two axial end faces of the stator core 11 or do not exceed the two axial end faces of the stator core 11 (i.e., the two groups of tooth surfaces 1121 of the stator core 11), so that the axial air gap between the tooth surfaces and the permanent magnet can be controlled more accurately and effectively.

Further, two outer end faces of the casing 8 are respectively provided with a circular boss coaxial with the stator assembly 1, as shown in FIG. 5.

Two circular bosses are arranged on the two outer end faces of the casing 8 (i.e., two axial end faces on the radial outer side of the casing 8) and are coaxially connected with the stator assembly 1, so that the casing can be conveniently matched with other structures to package the motor 100. Further, avoidance notches may be provided on the circular boss to facilitate assembly or commissioning of the motor 100.

Here, a circular boss located on one side of the first rotor assembly 21 is referred to as a first circular boss 82, and a circular boss located on one side of the second rotor assembly 22 is referred to as a second circular boss 83.

Further, a step surface 84 is provided at a position, close to an axial end of the plurality of contact pins 7, of the casing 8, and the plurality of contact pins 7 pass through the step surface 84 and protrude out of the step surface 84 along the axial direction of the stator assembly 1, as shown in FIG. 5.

A step surface 84 is arranged at a position, close to an axial end of the plurality of contact pins 7, of the casing 8, so that the plurality of contact pins 7 pass through the step surface 84 and protrude out of the step surface 84 along the axial direction of the stator assembly 1, which can provide an advantageous space for connection or installation of the contact pins and other conductive parts. Here, the step surface 84 can be arranged on the inner side wall of one of the circular bosses, so that the casing structure is further simplified.

Further, as shown in FIGS. 1 and 2, the motor 100 further comprises two end packaging covers which are coaxially and fixedly arranged at the two axial ends of the casing 8 respectively for packaging the motor 100 and are provided with shaft holes for extending out the two rotating shaft assemblies.

The end packaging covers are arranged at the two axial ends of the casing 8, so that the integrity of the motor is 100 guaranteed, and the internal structure of the motor 100 is effectively protected; and the end packaging cover is provided with a shaft hole for allowing the corresponding rotating shaft to extend out, so that the power of the motor 100 can be output. A step is formed between the outer wall surface of the circular boss and the outer wall surface of the casing 8, and the end packaging cover can be provided with a cover edge which is just matched with the step, so that the outer contour of the motor 100 is regular.

Among them, an end packaging cover located on one side of the first rotor assembly 21 is referred to as a first end packaging cover 131, and an end packaging cover located on one side of the second rotor assembly 22 is referred to as a second end packaging cover 132.

Further, as shown in FIGS. 1 and 2, the motor 100 further comprises an electric control plate 9 internally arranged between the rotor assembly on any side of the motor 100 and the end packaging cover.

Due to the arrangement of the electric control plate 9, automatic control of the motor 100 is facilitated; and the electric control plate 9 is arranged on any side of the motor 100 and positioned between the rotor assembly on the side and the end packaging cover, so that the stability of the electric control plate 9 is guaranteed, and the circuit output of the electric control plate 9 is facilitated.

Further, as shown in FIG. 2, the motor 100 further comprises two shaft sleeve packaging covers which are fixedly connected at axial ports of the shaft sleeves 3 for limiting the axial movement of the rotating shaft assemblies.

The shaft sleeve packaging covers are arranged at the two axial ports of the shaft sleeve 3, so that the axial movement of the rotational support in the shaft sleeve 3 can be prevented, the axial movement of the two rotating shaft assemblies is limited, and the reliability of the motor 100 is further improved. The sleeve packaging cover can be fixedly connected with the sleeve 3 via fasteners such as screws and the like.

The shaft sleeve packaging cover located on one side of the first rotor assembly 21 is referred to as a first shaft sleeve packaging cover 101, and the shaft sleeve packaging cover located on one side of the second rotor assembly 22 is referred to as a second shaft sleeve packaging cover 102.

Figure 7:
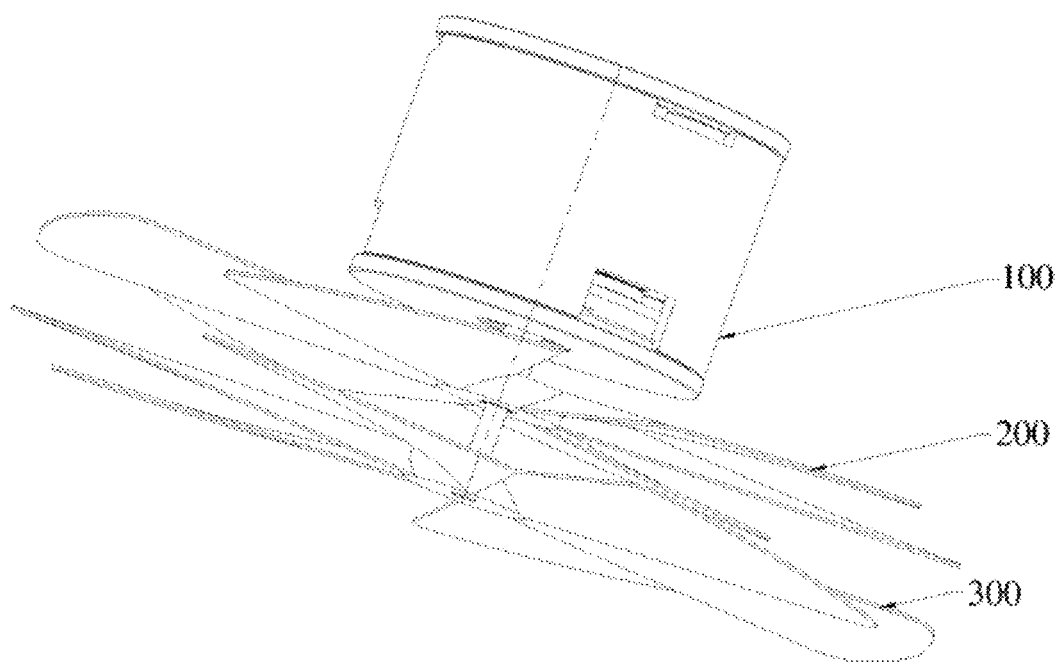
FIG. 7 is a schematic view showing a structure of a fan according to some embodiments of the present disclosure.

As shown in FIG. 7, an embodiment of the second aspect of the present disclosure provides a fan, comprising: at least one motor 100 according to any one of the embodiments of the first aspect; and two fans fixedly connected with the two rotating shaft assemblies of the motor 100 respectively, wherein the two fans rotate coaxially and independently.

Due to the fact that the fan provided by the embodiment of the second aspect of t the present disclosure comprises the motor 100 in any one of the embodiments of the first aspect, the fan has the remarkable advantages of compact structure, strong practical functionality, convenient installation, small axial size, low manufacturing cost and the like.

Here, a fan connected with the first rotating shaft assembly 41 is referred to as a first fan 200, and a fan connected with the second rotating shaft assembly 42 is referred to as a second fan 300.

In this description, the extension direction of the central axis in FIG. 1 is simply referred to as "axial direction", the direction around the central axis is simply referred to as "circumferential direction", and the direction perpendicular to the central axis is simply referred to as "radial direction".

The motor 100 and the fan provided by the present disclosure are described below in connection with a specific example.

As shown in FIGS. 1 to 7, a motor 100 includes a stator assembly 1, two rotor assemblies (i.e., a first rotor assembly 21 and a second rotor assembly 22), a shaft sleeve 3, and two shaft assemblies (i.e., a first rotating shaft assembly 41 and a second rotating shaft assembly 42).

In particular, the stator assembly 1 comprises a stator core 11 and two groups of windings (i.e., a first winding 121 and a second winding 122), the stator core 11 is connected by a stator yoke portion 111 and a plurality of removable stator teeth 112 into a radially hollow integral body with axially extending teeth, and the stator radial hollow provides an advantageous axial mounting space for the bearings of the motor 100. The first winding 121 and the second winding 122 are respectively wound on the stator tooth bodies 1123 on the two axial sides of the stator, and the first winding 121 and the second winding 122 can act independently of each other on the motor 100.

A plurality of rabbets (i.e., clamping slots 1111) are formed on the radial outer side of the stator yoke portion 111 and used for matching and installation of the stator tooth portion 112; and a circular hole groove (i.e., a through hole 1112) is formed on the radial inner side of the stator yoke portion 111 for mounting the shaft sleeve 3.

The single stator tooth portion 112 is provided with at least one tooth body 1123 and at least one tooth surface 1121. After the plurality of stator tooth portions 112 are matched and installed with the stator yoke portion 111, two groups of tooth bodies 1123 and two groups of tooth surfaces 1121 are arranged on the two axial sides of the stator yoke portion 111, and one group of tooth surfaces 1121 which act with the same rotor assembly are in one plane and perpendicular to the axis; and a limit step 1122 is provided on a surface on which the stator tooth portion 112 is matched and installed with the stator yoke portion 111 for abutting against an axial end face of the stator yoke portion 111 to define an axial relative position of the stator tooth portion 112 and the stator yoke portion 111.

The first rotor assembly 21 and the second rotor assembly 22 are oppositely and coaxially disposed axially outsides two axial sides of the stator assembly 1 to form an axial air gap with the stator assembly 1. The first rotor assembly 21 comprises a first rotor disk 211 and a first permanent magnet 212, the second rotor assembly 22 comprises a second rotor disk 221 and a second permanent magnet 222, and the first rotor assembly 21 and the second rotor assembly 22 are rotatable independently of each other.

The first rotor disk 211 and the second rotor disk 221 are generally identical in structure, and one of the rotor disks is illustrated as an example. The radial outer side of the rotor disk is of a disc-shaped structure, and the radial inner side of the rotor disk is of a disc-shaped plane or conical inclined plane structure, providing a favorable space for installation of other parts.

The radial outer side of the first rotor disk 211 is of a disc-shaped structure and is fixedly connected with the first rotating shaft 411 in a threaded connection mode; and the radial outer side of the second rotor disk 221 is of a disc-shaped structure and is fixedly connected with the second rotating shaft 421 by injection molding.

The first permanent magnet 212 and the second permanent magnet 222 are of a circular or fan-shaped pie structure and are uniformly distributed on the axial surface of the rotor disk disc-shaped structure in the circumferential direction to form axial magnetic flux; and N and S poles of two adjacent permanent magnets are alternately arranged or arranged in a Halbach array.

The shaft sleeve 3 is positioned in the hollow of the stator core 11 and coaxially fixed and extends out of the two axial sides of the stator yoke portion 111.

The outer wall of the shaft sleeve 3 is matched with a circular groove hole, at the radial inner side, of the stator yoke portion 111, the inner wall of the shaft sleeve 3 is matched with a bearing of the first rotating shaft assembly 41 and the second rotating shaft assembly 42, a flange 33 is provided on the radial outer side of the shaft sleeve 3 for limiting the axial direction of the stator yoke portion 111, and a plurality of small notches 34 are uniformly distributed in the radial direction of the flange 33 for stopping rotation and connection. A trench 35 is formed in the middle of the inner wall of the sleeve 3 for mounting the retaining ring to space the first rotational support 412 and the second rotational support 422 of the two rotating shaft assemblies.

The first rotating shaft assembly 41 and the second rotating shaft assembly 42 are coaxially and fixedly connected with the first rotor assembly 21 and the second rotor assembly 22, respectively, and output coaxially from the same axial side of the motor 100. The first rotating shaft assembly 41 and the second rotating shaft assembly 42 can rotate independently of each other. The first rotating shaft assembly 41 comprises a solid shaft and two bearings, wherein the two bearings are coaxially arranged on the radial outer side of the solid shaft and are axially spaced on the same axial side of the solid shaft which is fixedly connected with the first rotor assembly to form a first rotational support 412. The second rotating shaft assembly 42 comprises a hollow shaft and two bearings coaxially provided at the radial outer side of the hollow shaft and axially spaced on the same axial side of the hollow shaft which is fixedly connected with the first rotor assembly to form a second rotational support 422. The first rotational support 412 of the first rotating shaft assembly 41 and the second rotational support 422 of the second rotating shaft assembly 42 are disposed at the two axial sides of the motor 100, and are all received in the shaft sleeve 3.

The motor 100 further comprises a first insulating frame 51 and a second insulating frame 52 mounted on the tooth body 1123 of the stator tooth, a mounting bracket 6 fixedly connected to the first insulating frame 51 or the second insulating frame 52, and a plurality of contact pins 7 inserted on the mounting bracket 6. Lead-out wires of the first winding 121 and the second winding 122 are each fixedly connected to the plurality of contact pins 7, so that the lead-out wires of the first winding 121 and the second winding 122 are led out to a fixed and stable conductive carrier.

The mounting bracket 6 is of an arc-shaped strip structure coaxial with the stator, and the mounting bracket 6 and the plurality of contact pins 7 are located on the radial outer sides of the first rotor assembly 21 and the second rotor assembly 22.

The motor 100 further comprises a plastic casing 8 fixedly connecting the stator assembly 1, the first insulating frame 51 and the second insulating frame 52, the mounting bracket 6, the plurality of contact pins 7 and the shaft sleeve 3 to one another to provide an integrated structure. The outer diameter of the plastic casing 8 is greater than the maximum radial outer contour surface formed collectively by the stator assembly 1, the first insulating frame 51, the second insulating frame 52, the mounting bracket 6 and the plurality of contact pins 7. The wrapping surfaces (i.e., the two axial end faces of the casing 8) of the stator tooth portions 112 on the two axial sides are flush or do not exceed the two groups of tooth surfaces 1121 of the stator assembly 1. Two cylindrical bosses (i.e., circular bosses) coaxial with the stator assembly 1 are provided on the outer sides of the two axial ends of the plastic casing 8; and the plastic casing 8 is provided with a step surface 84 on the side where the contact pin 7 is located, and the contact pin 7 is exposed out of the step surface 84 by a certain distance, so that a space is provided for connecting or installing the contact pin 7 with other conductive parts.

The motor 100 further comprises a first sleeve packaging cover 101 and a second sleeve packaging cover 102, and the first sleeve packaging cover 101 and the second sleeve packaging cover 102 are fixedly connected at a port of the sleeve 3 and define the axial movement of the first rotating shaft assembly 41 and the second rotating shaft assembly 42.

The motor 100 further comprises a first end packaging cover 131 and a second end packaging cover 132. The first end packaging cover 131 and the second end packaging cover 132 are coaxially and fixedly mounted at the two axial ends of the plastic casing 8 respectively and are used for packaging the motor 100, and the end packaging cover is matched with the plastic casing 8 via a spigot.

The motor 100 may further comprise an electric control plate 9 interposed between the first rotor assembly 21 and the first end packaging cover 131 or between the second rotor assembly 22 and the second end packaging cover 132 on either side of the motor 100.

The motor 100 may further comprise a support bearing 110 coaxially provided between the output end of the hollow shaft and the solid shaft for increasing the support strength of the first rotating shaft assembly 41 and the second rotating shaft assembly 42.

An electrical fan comprises a motor 100, a first fan 200, and a second fan 300. The first fan 200 and the second fan 300 are coaxially and fixedly connected with the first rotating shaft assembly 41 and the second rotating shaft assembly 42 respectively, and output on the same side of the motor 100. The first fan 200 and the second fan 300 rotate coaxially and independently.

Therefore, the motor and the fan have the remarkable advantages of compact structure, strong practical functionality, convenient installation, small axial size, low manufacturing cost and the like.

The motor and the fan according to some embodiments of the present disclosure are described below with reference to FIGS. 8-15.

Embodiment 1

Figure 8:
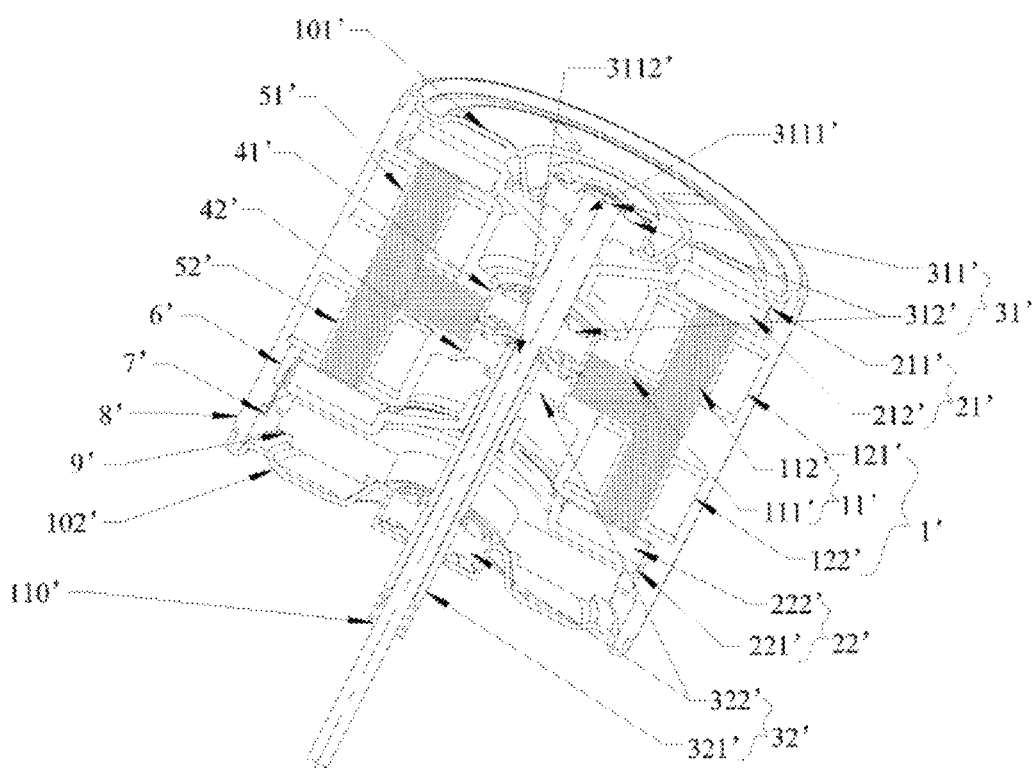
FIG. 8 is a schematic view showing a partial structure of a motor according to some embodiments of the present disclosure.
Figure 9:
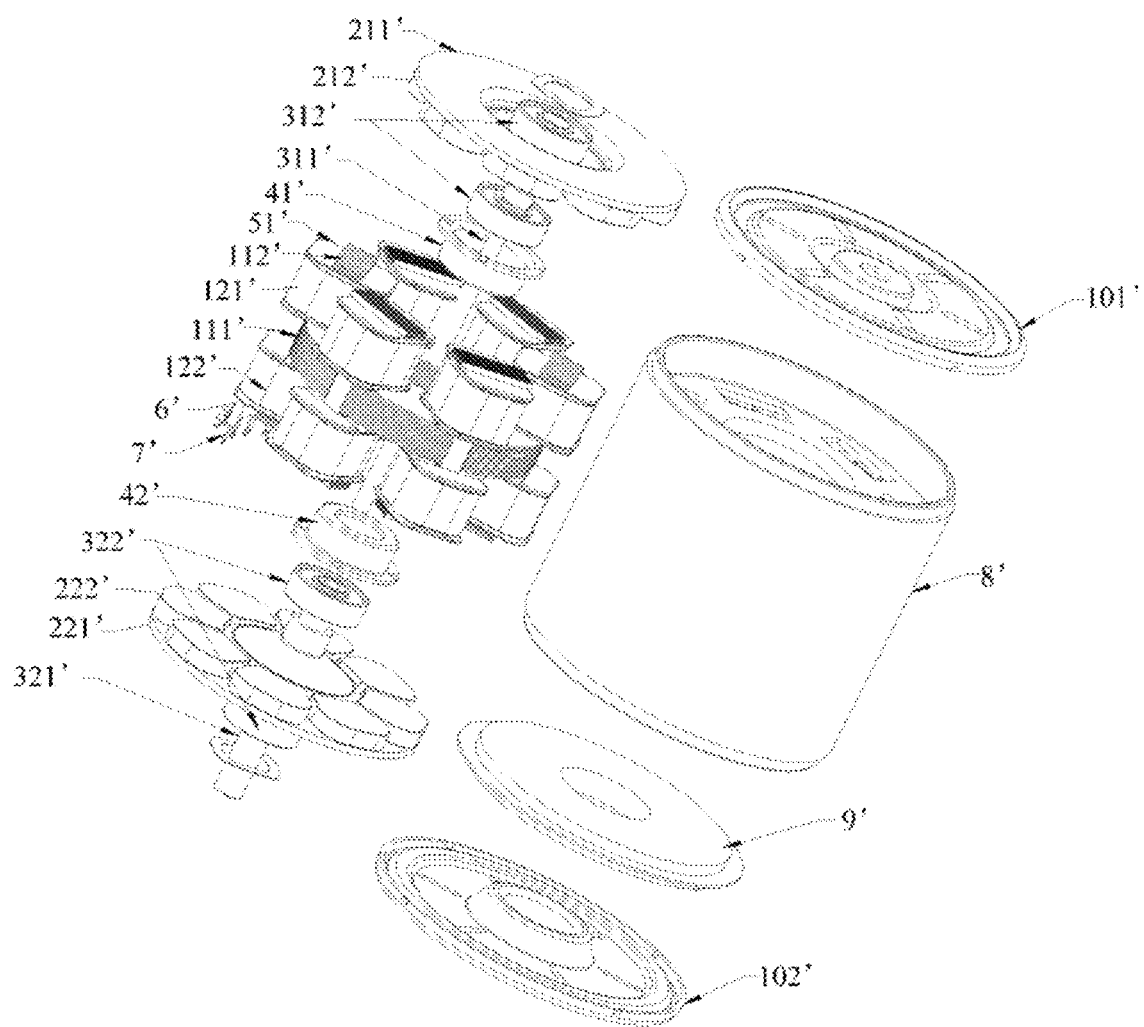
FIG. 9 is an exploded structural view of a motor according to some embodiments of the present disclosure.

As shown in FIGS. 8 and 9, an embodiment of the first aspect of the present disclosure provides a motor 100' including: a stator assembly 1', two mutually independent rotor assemblies and two mutually independent rotating shaft assemblies.

Figure 10:
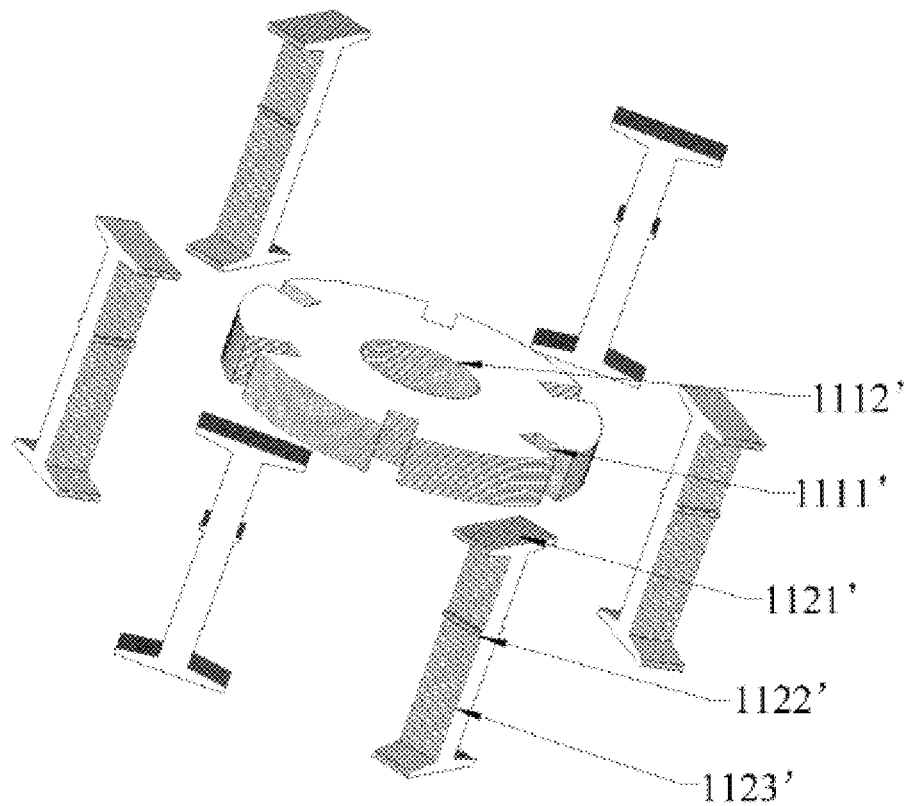
FIG. 10 is a schematic view showing a structure of a stator assembly according to some embodiments of the present disclosure.

For example, the stator assembly 1' comprises a stator core 11' and two groups of mutually independent windings; a hollow channel is arranged in a radial middle part of the stator core 11', as shown in FIG. 9, two axial end portions of the stator core 11' are provided with stator teeth protruding towards two axial sides of the stator core, as shown in FIG. 10, and the two groups of windings are wound on the two groups of stator teeth respectively; two mutually independent rotor assemblies are oppositely and coaxially arranged on two axial sides of the stator assembly 1' and form an axial air gap with the stator assembly 1', and the two rotor assemblies are configured to rotate independently; and two mutually independent rotating shaft assemblies which comprise a rotating shaft and a rotational support, wherein the rotational support is at least partially received in the hollow channel and sleeved on the rotating shaft and is used for supporting the rotating shaft and enabling the rotating shaft to rotate relative to the stator core 11', and the two rotating shafts are respectively coaxially connected with the two rotor assemblies and protrude in a direction of the same side away from the stator core 11' along the axial direction of the motor 100', as shown in FIGS. 8 and 9.

According to the motor 100' provided by the embodiment of the first aspect of the present disclosure, dual-power independent output of one motor 100' is realized by matching one stator assembly, two mutually independent rotor assemblies and two mutually independent rotating shaft assemblies, and two fans can be driven to independently rotate at respective rotating speeds and directions without interference. Compared with the solution that the two motors 100' are respectively connected with the two fans in a backward axial extension mode, in the present disclosure, at least one stator assembly 1' is omitted, the axial size of the fan is reduced, and the cost of the fan is reduced. Compared with the solution that a single-shaft motor 100' and a gear mechanism are matched to realize the shaft extension at both ends, in the present disclosure, the two fans rotate at any rotating speed and direction, the practical functionality is strong, the diversification of the fan functionality is remarkably improved, the gear mechanism is omitted, and the manufacturing and installation difficulty of products is reduced.

In particular, the electric machine 100' comprises a stator assembly 1', two mutually independent rotor assemblies and two mutually independent rotating shaft assemblies. The stator assembly 1' comprises a stator core 11' and two groups of mutually independent windings. Stator teeth are arranged at two axial ends of the stator core 11', and the two groups of stator teeth protrude towards both sides along the axial direction of the stator core 11' and are wound by the two groups of windings, so that the two groups of windings can independently act on the motor 100'. A hollow channel is arranged at a radial middle part of the stator core 11', providing an advantageous axial installation space for installation of the rotating shaft assemblies, so that parts of the two rotating shaft assemblies can be inserted into the hollow channel, and the axial size of the motor 100' is further shortened. The two rotor assemblies are oppositely and coaxially arranged on two axial sides of the stator assembly 1', face the two groups of windings respectively, and form an axial air gap with the stator assembly 1', which ensures that the two rotor assemblies do not interfere with each other and have independent rotation. The rotating shaft assembly comprises a rotating shaft and a rotational support, wherein the rotational support is partially or completely received in the hollow channel and is sleeved on the rotating shaft, which guarantees the stability of the position of the rotating shaft and the stability in the rotating process; and the rotating shaft is coaxially connected with the rotor assembly, so that the power output function of the motor 100' is realized. The two rotating shaft assemblies are independent from each other, are coaxially connected with the corresponding rotor assemblies respectively, and rotate synchronously with the corresponding rotor assemblies respectively. The two rotating shaft assemblies protrude towards the same axial side of the motor 100', so that one axial end of the motor 100' can output two types of power which are not interfered with each other. Compared with the axial extension of the motor 100' at both sides, the axial distance of the output end of the motor 100' can be shortened. Because the two groups of windings of the stator assembly 1 are independent from each other, the two rotor assemblies are independent from each other, and the two rotating shaft assemblies are independent from each other, the two axial ends of the motor 100' can output two independent torques, which is equivalent to realizing the functions of the two independent motors 100' by using one motor 100'. Therefore, the present disclosure has the remarkable advantages of compact structure, strong practical functionality, convenient installation, small axial size and low manufacturing cost.

The two rotor assemblies may be referred to as a first rotor assembly 21' and a second rotor assembly 22', respectively, the shaft assembly connected to the first rotor assembly 21' being referred to as a first rotating shaft assembly 31', the shaft assembly connected to the second rotor assembly 22' being referred to as a second rotating shaft assembly 32', the winding cooperating with the first rotor assembly 21 being referred to as a first winding 121', and the winding cooperating with the second rotor assembly 22' being referred to as a second winding 122'.

For example, the rotating shaft and the rotational support of the first rotating shaft assembly 31' are respectively referred to as a first rotating shaft 311' and a first rotational support 312', and the rotating shaft and the rotational support of the second rotating shaft assembly 32' are respectively referred to as a second rotating shaft 321' and a second rotational support 322'.

The rotating support comprises at least one bearing, as shown in FIGS. 8 and 9.

The rotational support comprises at least one bearing used for supporting the rotating shaft, so that the reliability of the rotating shaft can be remarkably improved. Of course, the rotational support is not limited to a bearing, and other structures are possible. For example, a plurality of roller pins are arranged on the inner side wall of the hollow channel along the circumferential direction, and the rotating shaft is supported by the plurality of roller pins; or a plurality of connecting rings are axially arranged on the inner side wall of the hollow channel, the inner side wall of each connecting ring is a smooth surface, and the rotating shaft is supported by the plurality of connecting rings.

For example, the number of bearings is plural, and the plurality of bearings are distributed on the two axial sides of the rotor assembly at intervals along the length direction of the rotating shaft, as shown in FIGS. 8 and 9.

A plurality of bearings are arranged at intervals along the length direction of the rotating shaft, so that a plurality of parts of the rotating shaft can be supported, the supporting reliability of the rotational support to the rotating shaft is improved, and the reliability of the rotating shaft assembly is further improved; and a plurality of bearings are located on the two axial sides of the corresponding rotor assembly, so that a plurality of positions of the rotating shaft can be supported dispersedly, the supporting reliability of the rotating shaft is improved, the risk that the rotating shaft inclines and the like is obviously reduced, and the using reliability of the motor 100' is improved.

Furthermore, the number of the bearings is two, as shown in FIGS. 8 and 9. The two bearings not only can effectively improve the supporting reliability of the rotating shaft assembly, but also can reduce the number of components and save the production cost.

Further, as shown in FIGS. 8 and 9, the motor 100' further comprises two bearing covers sleeved in the hollow channel and fixedly connected with the stator core 11'. The two bearing covers are arranged opposite to each other for respectively supporting the bearings axially inwards of the corresponding rotating shaft assemblies.

The two bearing covers are arranged in the hollow channel to support the bearings axially inwards of the two rotating shaft assemblies (i.e., the bearings relatively close to the interior of the motor 100'). Because the two bearing covers are arranged opposite to each other, the two rotational supports can be well limited, so that the two rotating shaft assemblies and the stator assembly do not interfere each other, and the probability that the rotating shaft assemblies shake, tilt, shift and the like is reduced; and the reliability of the motor 100' is improved, the assembly precision of the rotating shaft assembly is improved, and the installation is more convenient. In addition, the two bearing covers can play a role of a separator, and the rotational supports of the two rotating shaft assemblies are separated at intervals, so that the two rotating shaft assemblies are effectively prevented from interfering with each other, and the reliability of the two rotating shaft assemblies is further improved.

Here, the bearing cover corresponding to the first rotating shaft assembly 31' is referred to as a first bearing cover 41', and the bearing cover corresponding to the second rotating shaft assembly 32' is referred to as a second bearing cover 42'.

Figure 11:
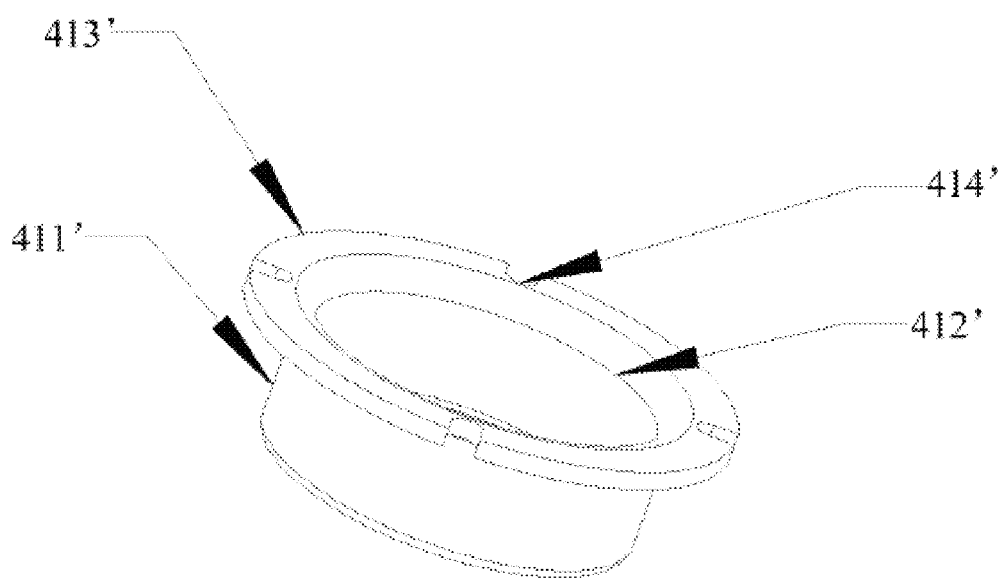
FIG. 11 is a schematic view showing a partial structure of a bearing cover according to some embodiments of the present disclosure.

Further, the bearing cover is adapted to the shape of the bearing, as shown in FIGS. 9 and 11, and the bearing is received in the bearing cover and supported by the bearing cover, as shown in FIG. 8.

The bearing covers are adapted to the forms of the bearings, so that the bearings axially inwards of the two rotating shaft assemblies can sink into the bearing covers, achieving effective support and limit, and the reliability of the motor 100' is further improved.

Further, an open end of the bearing cover is provided with a flanging 413' extending radially outwards, as shown in FIG. 11.

The open end of the bearing cover is provided with the flanging 413', the flanging 413' extends radially outwards and can be in concave-convex fit with the casing 8' subjected to later injection molding, achieving a certain limiting effect, and the bearing cover is prevented from moving axially relative to the stator core 11'.

Further, the flange 413' is provided with at least one notch 414', as shown in FIG. 11.

The flanging 413' is provided with at least one notch 414' which can be in concave-convex fit with the casing 8' subjected to later injection molding, so that the bearing cover is prevented from rotating circumferentially relative to the stator assembly 1', and the stability of the bearing cover is further improved. Further, the number of the notches 414' is plural, and the plurality of notches 414' are distributed at intervals along the circumferential direction of the flanging 413'.

Further, the rotating shaft of one of the shaft assemblies is a hollow shaft, as shown in FIG. 8, and the shaft of the other shaft assembly extends out through the hollow shaft, as shown in FIGS. 8 and 9, and is suitable for rotating relative to the hollow shaft.

The rotating shaft of one of the rotating shaft assemblies is a hollow shaft, and the rotating shaft of the other one of the rotating shaft assemblies can extend through the hollow shaft, so that the two rotating shaft assemblies protrude in the same direction, and one axial end of the motor 100' can be simultaneously connected with two fans or other components. In particular, the shaft of the other shaft assembly is a solid shaft, which is advantageous for improving the strength of the shaft. Of course, the shaft of the other shaft assembly may also be a hollow shaft.

For example, the rotating shaft assembly in which the rotating shaft is a hollow shaft is referred to as the second rotating shaft assembly 32', the rotating shaft of the second rotating shaft assembly 32' is referred to as the second rotating shaft 321', and the rotating shaft of the first rotating shaft assembly 31' is referred to as the first rotating shaft 311'. For example, the first rotating shaft 311' is a solid shaft, as shown in FIG. 8.

Further, the rotating shaft of the other one of the rotating shaft assemblies (i.e., the first rotating shaft assembly 31') includes a connecting section 3111' and an extending section 3112' connected to the connecting section 3111'. As shown in FIG. 8, the outer diameter of the connecting section 3111 is equal to the outer diameter of the hollow shaft, the connecting section 3111' and the hollow shaft are arranged along the axial direction of the hollow channel, and the extending section 3112' protrudes through the hollow shaft.

The rotating shaft of the other one of the rotating shaft assemblies comprises a connecting section 3111' and an extending section 3112', the outer diameter of the connecting section 3111' is equal to the outer diameter of the hollow shaft, the connecting section 3111' and the hollow shaft are arranged along the axial direction of the hollow channel, and the outer contour of the parts in the hollow channel after the two rotating shafts are assembled is kept flush, so that the structure of the product is more regular, it is convenient for machine-shaping the product, and the assembly is also convenient. Meanwhile, a part (i.e., the connecting section 3111') of the rotating shaft connected with the rotor assembly is relatively thick, the strength of the rotating shaft is improved, and the reliability of the rotating shaft is favorably improved; and the two rotating shafts are conveniently supported by supporting structures such as bearings and the like of the same type, so that the reliability and the stability of the motor 100' are improved.

Further, as shown in FIG. 8, the motor 100' further comprises a support bearing 110' coaxially provided between an output end of the hollow shaft and the other one of the rotating shafts.

A support bearing 110' is additionally arranged between an output end portion of the hollow shaft and the other one of the rotating shafts, so that the support rigidity of the two rotating shaft assemblies can be further improved, and the reliability of the motor 100' is further improved.

Further, the stator core 11' comprises a stator yoke portion 111' and a plurality of stator tooth portions 112' arranged along the circumferential direction of the stator yoke portion 111'. As shown in FIG. 10, the stator core 11' is formed by assembling the stator tooth portions 112' and the stator yoke portion 111', the stator tooth portions 112' protrude to two axial sides of the stator yoke portion 111' to form two groups of stator teeth, and the two groups of windings are wound on the stator teeth on the two axial sides of the stator yoke portion 111' respectively.

According to the solution, the stator core 11' is divided into a stator yoke portion 111' and a plurality of stator tooth portions 112', so that the processing difficulty of the stator core 11' is reduced, and the winding difficulty of two groups of windings is reduced. The stator yoke portion 111' can be formed by laminating a plurality of stator punching sheets, and the stator tooth portion 112' can also be formed by laminating a plurality of stator punching sheets. Of course, the stator core 11' may also be of unitary construction.

Further, a radial middle portion of the stator yoke portion 111' is provided with a through hole 1112' adapted to the bearing cover of the motor 100', which forms a part of the hollow channel of the stator core 11', as shown in FIG. 10, the radial middle part of the stator yoke portion 111' is provided with a through hole 1112' adapted to the bearing cover of the motor 100', and as shown in FIG. 10, the through hole 1112' constitutes a part of the hollow channel of the stator core 11'.

Due to the fact that the plurality of stator tooth portions 112' are arranged along the circumferential direction of the stator yoke portion 111', a certain hollow space is enclosed by the plurality of stator tooth portions 112'. Thus, a through hole 1112' is formed in the radial middle part of the stator yoke portion 111', the through hole 1112' and the hollow space form a hollow channel, which can provide an advantageous axial installation space for the rotating shaft assembly, and the axial size of the motor 100' is shortened.

Further, a radial outer side wall of the stator yoke portion 111' is provided with a clamping slot 1111', and as shown in FIG. 10', a part of the stator tooth portion 112' is embedded into the clamping slot 1111', so that the stator tooth portion 112' is in clamping fit with the stator yoke portion 111'.

A clamping slot 1111' is formed in the radial outer side wall of the stator yoke portion 111', and the stator tooth portion 112' can be clamped on the stator yoke portion by the clamping slot 1111', so that the stator yoke portion 111' and the stator tooth portion 112' can be assembled. The structure is simple, and it is easy to process and assemble.

Each of the stator tooth portions 112' comprises at least one stator tooth. The stator tooth comprises a tooth body 1123' and a tooth surface 1121' connected with one axial end of the tooth body 1123' and located on one axial side of the stator yoke portion 111'. All tooth surfaces 1121' of any one of the groups of stator teeth are located in a same plane and are perpendicular to the axis of the stator yoke portion 111'.

Each of the stator tooth portions 112' comprises at least one stator tooth. The stator tooth comprises a tooth body 1123' and a tooth surface 1121', and the tooth surface 1121' is connected with an axial end, far away from the stator yoke portion 111', of the tooth body 1123' and is positioned on the axial side of the stator yoke portion 111'. All tooth surfaces 1121' of any set of stator teeth lie in the same plane and are perpendicular to the axis of the stator yoke portion 111', ensuring that an axial air gap can be formed with the rotor assembly on that side.

Further, the stator tooth portion 112' comprises two stator teeth, and a limit step 1122' is arranged on the tooth body 1123' of the stator tooth portion 112' and abuts against the stator yoke portion 111' for limiting axial movement of the stator tooth portion 112' with respect to the stator yoke portion 111', as shown in FIG. 10.

One stator tooth portion 112' comprises two stator teeth, the tooth surfaces 1121' of the two stator teeth are respectively positioned on two axial sides of the stator yoke portion 111', and an axial air gap can be formed with rotor assemblies on the two sides. Compared with the solution that one stator tooth 112' only comprises one stator tooth, the number of the stator teeth 112' is reduced, and the assembly process is simplified. Of course, one stator tooth 112' may also comprises only one stator tooth, and two opposing stator tooth portions 112' are installed at one position of the stator core 11' to form two stator teeth.

Embodiment 2

Figure 14:
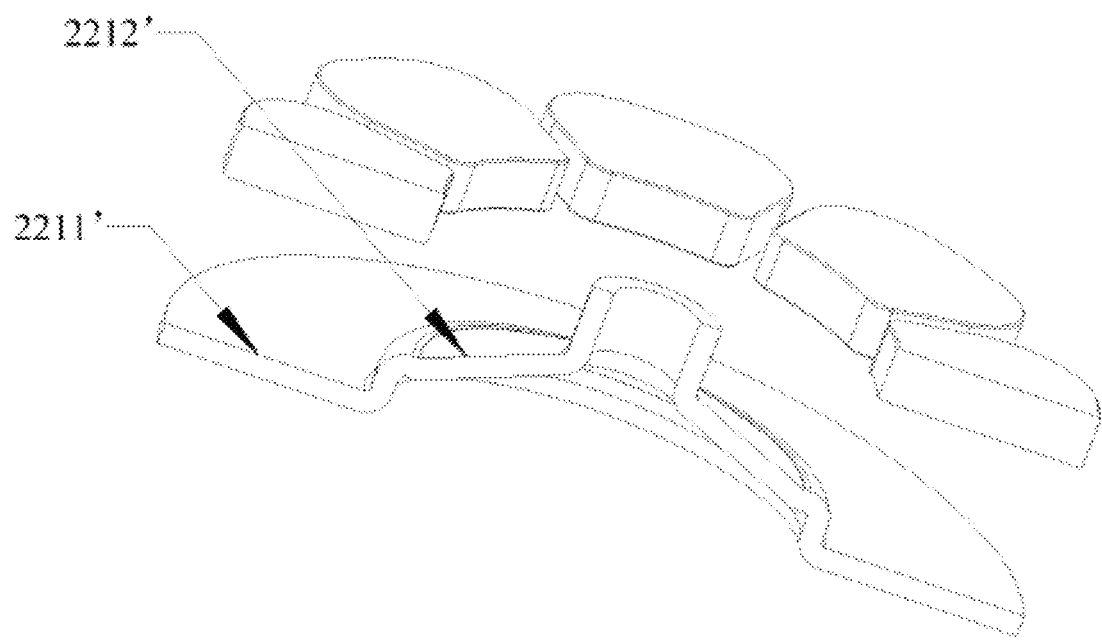
FIG. 14 is a partially exploded structural view of a rotor according to some embodiments of the present disclosure.

The difference from Embodiment 1 is as follows: on the basis of Embodiment 1, further, as shown in FIG. 14, the rotor assembly comprises a rotor disk coaxially connected with a corresponding rotating shaft and a permanent magnet mounted on the rotor disk, and the rotor disk comprises a disk body exterior 2211' and a disk body interior 2212' connected with the disk body exterior 2211' from outside to inside in a radial direction of the rotor disk, wherein the disk body exterior 2211' is of a disk-shaped structure, and the disc interior 2212' is of a disc-shaped structure or a cone-shaped structure.

The rotor assembly comprises a rotor disk and a permanent magnet, and the rotor disk serves as a mounting carrier of the permanent magnet, achieving coaxial connection between the rotor assembly and the rotating shaft; the permanent magnet is mounted on the rotor disk to generate a magnetic field that interacts with the stator assembly 1'. The disc body exterior of the rotor disk 2211' is of a disc-shaped structure, and the structure is regular, which facilitates processing and molding and arrangement of a plurality of permanent magnets; and the disc body exterior 2212' is of the disc-shaped structure or the conical structure, and the assembly structure of the rotor disk and the rotating shaft assembly can be reasonably designed according to the specific structure of the product, providing a favorable space for the installation of other parts.

For example, the rotor disk and permanent magnet of the first rotor assembly 21' are referred to as a first rotor disk 211' and a first permanent magnet 212', respectively, and the rotor disk and permanent magnet of the second rotor assembly 22' are referred to as a second rotor disk 221' and a second permanent magnet 222', respectively'.

The rotor disk and the rotating shaft are of an integrated structure formed by injection molding.

Alternatively, the rotor disk and the rotating shaft are of an integrated structure formed by welding.

Alternatively, the rotor disk is threadably connected with the rotating shaft.

Alternatively, the rotor disk is in interference fit with the rotating shaft.

The rotating shaft assembly comprises a rotating shaft, the rotor disk and the rotating shaft are coaxially connected and fixed together by injection molding or welding fabrication to form an integrated structure, or achieve a fixed connection by threaded connection, interference assembly and the like, so that the connection reliability of the rotating shaft and the rotor disk is effectively guaranteed, and the reliability of synchronous rotation of the rotating shaft and the rotor assembly is guaranteed. Of course, the rotating shaft may be fixedly connected with the rotor disk in other ways, such as by fasteners, etc.

For example, the permanent magnet is of a circular or fan-shaped pie structure, the number of the permanent magnets is plural, and the plurality of permanent magnets are uniformly distributed on the axial surface of the rotor disk facing the stator yoke portion 111' circumferentially to form axial magnetic flux; and N poles and S poles of two adjacent permanent magnets are alternately arranged or are arranged in a Halbach array.

The permanent magnets have a circular or fan-shaped pie structure, are arranged conveniently, reduce the axial size of the motor 100', and are uniformly distributed on a surface, facing the stator yoke portion 111', of the rotor disk along the circumferential direction of the rotor disk, so that axial magnetic flux is formed between the rotor assembly and the stator assembly 1'. N poles and S poles of the two adjacent permanent magnets can be alternately arranged or can be arranged in a Halbach array, and the N poles and the S poles of the two adjacent permanent magnets can be adjusted according to product requirements.

Embodiment 3

The difference from Embodiment 2 is as follows: on the basis of Embodiment 2, the motor 100' further comprises an insulating frame, a mounting bracket 6' and a plurality of pins 7', as shown in FIGS. 8 and 9.

For example, the insulating frame is mounted on the stator teeth; the mounting bracket 6' is fixedly connected to the insulating frame; a plurality of contact pins 7' are inserted to the mounting bracket 6', wherein lead-out wires of the two groups of windings are fixedly connected to the plurality of contact pins 7'.

The motor 100' further comprises an insulating frame, a mounting bracket 6' and a plurality of contact pins 7', and the insulating frame is mounted on the stator teeth, which guarantees the safety and reliability of the windings mounted on the stator teeth; the mounting bracket 6' is fixedly connected with the insulating frame, a plurality of contact pins 7' are inserted into the mounting bracket, lead-out wires of the two groups of windings are fixedly connected to the plurality of contact pins 7', and accordingly the lead-out wire heads of the two groups of windings are led to a fixed and stable conductive carrier.

The number of the insulating frames is two or two groups, the two or two groups of the insulating frames are respectively mounted on two groups of stator teeth and are respectively referred to as a first insulating frame 51' and a second insulating frame 52', and the mounting bracket 6' is fixedly connected with one of the insulating frames.

Figure 13:
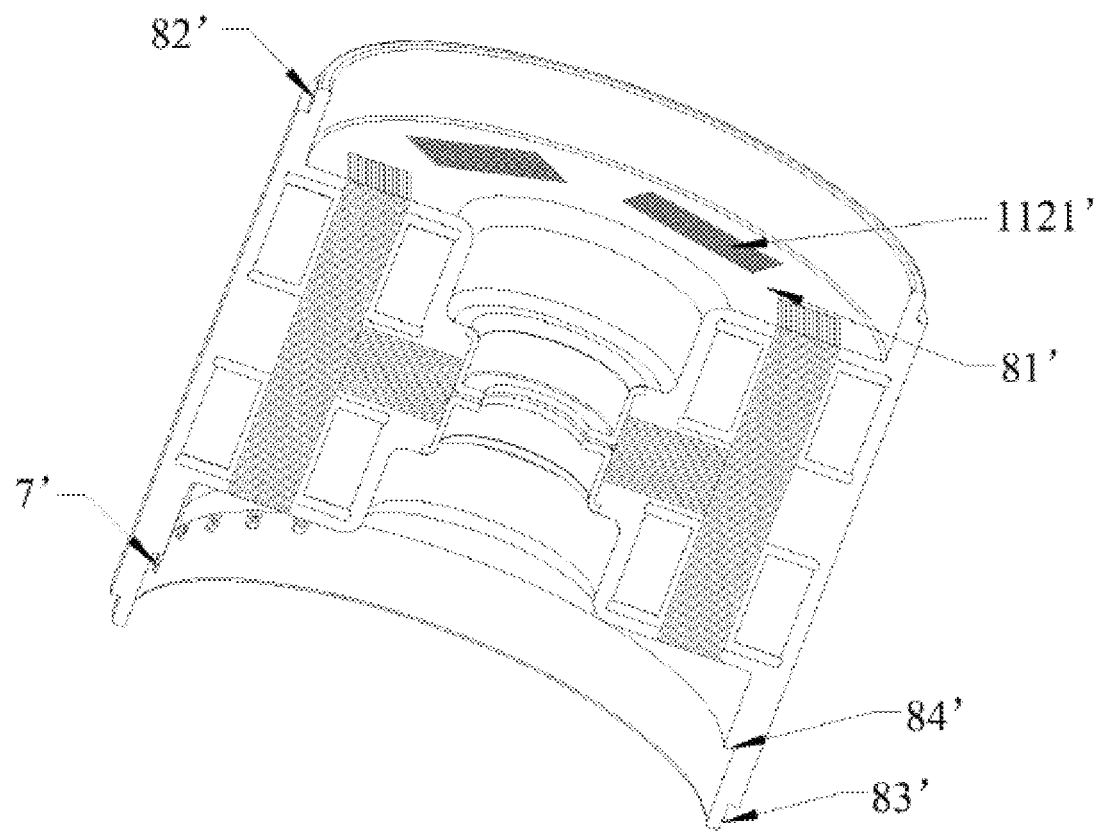
FIG. 13 is a schematic view showing a partial structure of a motor according to some embodiments of the present disclosure.

For example, the mounting bracket 6' is of an arc-shaped strip structure coaxial with the stator assembly 1', and the mounting bracket 6' and the plurality of contact pins 7' are located on the radial outer side of the rotor assembly, as shown in FIG. 13.

The mounting bracket 6' is of an arc-shaped strip structure coaxial with the stator assembly 1', and the mounting bracket 6' and the plurality of contact pins 7' are located on the radial outer side of the rotor assembly, so that the structure of the motor 100' is relatively regular, the internal magnetic field of the motor 100' is not easily interfered, and meanwhile the motor is convenient to be connected with an external circuit.

Further, the motor 100' further comprises a casing 8', as shown in FIG. 9, which is an injection molded body and fixedly connects the insulating frame, the mounting bracket 6', the plurality of contact pins 7' and the two bearing covers of the motor 100' to one another to provide an integrated structure, as shown in FIG. 13, wherein, an outer diameter of the casing 8' is greater than the maximum radial outer contour surface formed by the stator assembly 1', the insulating frame, the mounting bracket 6', the plurality of contact pins 7'; and the two axial end faces of the casing 8' both comprise an inner end face and an outer end face connected with the outer edge of the inner end face, and the outer end face is located on the radial outer side of the inner end face and at least partially protrudes out of the inner end face, so that the two axial end faces of the casing 8' form a stepped structure with high outer height and low inner height, wherein the two inner end faces are flush with the axial end faces of the stator core 11' or do not exceed the axial end faces of the stator core 11'.

Figure 12:
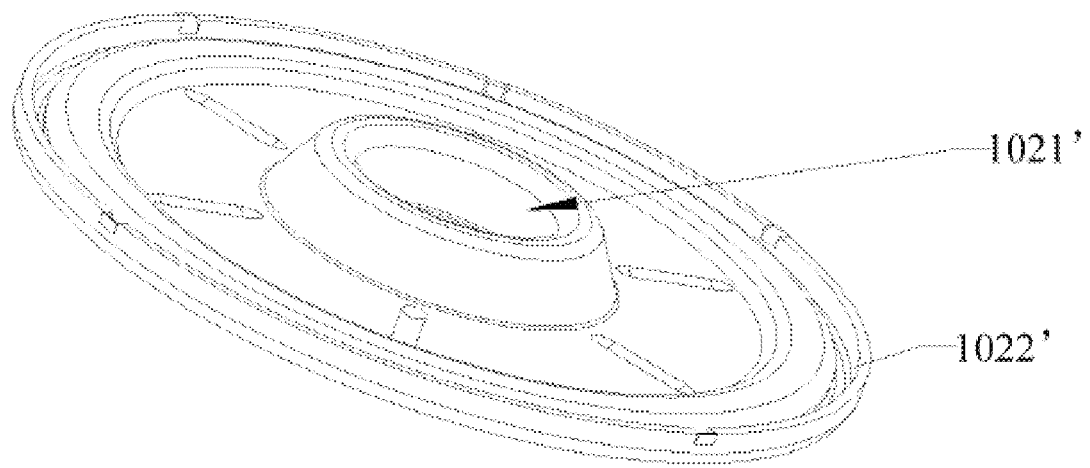
FIG. 12 is a schematic view showing a partial structure of an end packaging cover according to some embodiments of the present disclosure.

The motor 100' further comprises a casing 8', wherein the casing is an injection molded body for coating the insulating frame, the mounting bracket 6' and other structures, so that the insulating frame, the mounting bracket 6', the plurality of contact pins 7' and two bearing covers can be fixedly connected to form a whole, and the stability of the motor 100' is guaranteed; and the outer diameter of the casing 8' is greater than the maximum radial outer contour surface formed by the stator assembly 1', the insulating frame, the mounting bracket 6' and the plurality of contact pins 7', so that the components are coated in the radial outer surface of the casing 8', and it guarantees the integrity and the regularity of the appearance of the motor 100' and the insulation between the motor and the outside. Meanwhile, the two axial end faces (which can also be called tooth wrapping surfaces 81') of the casing 8' are not regular planes, but are stepped structures with high outer height and low inner height and low outside, as shown in FIGS. 9 and 12, and a portion which is located radially outside and protrudes is referred to as an outer end face which is relatively small in size; and a portion recessed on the inside is referred to as an inner end face which is relatively large in size, as shown in FIGS. 9 and 12.

The two inner end faces (i.e., the two axial end faces on the radial inner side of the casing 8') are flush with the two axial end faces of the stator core 11' or do not exceed the two axial end faces of the stator core 11' (i.e., the two groups of tooth surfaces 1121' of the stator core 11'), so that the axial air gap between the tooth surfaces and the permanent magnet can be controlled more accurately and effectively.

Further, a step surface 84' is provided at a position, close to an axial end of the plurality of contact pins 7', of the casing 8', and the plurality of contact pins 7' pass through the step surface 84' and protrude out of the step surface 84' along the axial direction of the stator assembly 1', as shown in FIG. 13.

A step surface 84' is arranged at a position, close to an axial end of the plurality of contact pins 7', of the casing 8', so that the plurality of contact pins 7' pass through the step surface 84' and protrude out of the step surface 84' along the axial direction of the stator assembly 1', which can provide an advantageous space for connection or installation of the contact pins and other conductive parts.

Further, as shown in FIGS. 8 and 9, the motor 100' further comprises two end packaging covers which are coaxially and fixedly arranged at the two axial ends of the casing 8' respectively for packaging the motor 100' and are provided with shaft holes for extending out the corresponding rotating shafts.

The end packaging covers are arranged at the two axial ends of the casing 8', so that the integrity of the motor is 100' guaranteed, and the internal structure of the motor 100' is effectively protected; and the end packaging cover is provided with a shaft hole for allowing the corresponding rotating shaft to extend out, so that the power of the motor 100' can be output. A step is formed between the outer wall surface of the circular boss and the outer wall surface of the casing 8', and the end packaging cover can be provided with a cover edge which is just matched with the step, so that the outer contour of the motor 100' is regular.

Among them, an end packaging cover located on one side of the first rotor assembly 21' is referred to as a first end packaging cover 101', and an end packaging cover located on one side of the second rotor assembly 22' is referred to as a second end packaging cover 102'.

Further, the end packaging cover is provided with a bearing chamber 1021' for receiving the corresponding bearings which are axially outward of the rotating shaft assembly, as shown in FIG. 12.

The bearing chambers 1021' are arranged on the two end packaging covers to support the bearings (i.e., the bearings relatively close to the outside of the motor 100') axially outward of the two rotating shaft assemblies, so that the two rotational supports can be further supported and limited, and the reliability of the two rotating shaft assemblies is further improved. In addition, the bearing chamber 1021' is integrated on the end packaging cover, so that the end packaging cover also plays a role of the bearing cover. Compared with the solution of setting additional bearing cover and then fixing it on the end packaging cover, the number of components is reduced, the assembly process is simplified, and the production cost is reduced.

For example, as shown in FIG. 12, the middle part of the end packaging cover is firstly recessed to form a counter sink, the bottom wall of the counter sink is partially reversely protruded to form a boss, and the space defined by the boss is a bearing chamber 1021'. Further, the disc body interior of the rotor disk corresponding to the end packaging cover is constructed in a conical slope structure, as shown in FIG. 14, to fit the end packaging cover. Therefore, the inner space of the hollow channel can be reasonably utilized, and the axial size of the motor 100' can be further reduced.

Further, two outer end faces of the casing 8' are respectively provided with a circular boss coaxial with the stator assembly, as shown in FIG. 13, an annular groove 1022' is provided at an edge position of the end packaging cover, and the circular boss is embedded into the corresponding annular groove, as shown in FIG. 8.

When two circular bosses are arranged on the two outer end faces of the casing 8' (i.e., the two axial end faces on the radial outer side of the casing 8'), the two circular bosses are coaxially connected with the stator assembly, and an annular groove 1022' provided in an edge position of the end packaging cover, the circular bosses are embedded in the annular groove 1022' to realize the sealing fit, and the end packaging cover can be assembled in place. The structure is simple, and the assembly is convenient.

Here, a circular boss located on one side of the first rotor assembly 21' is referred to as a first circular boss 82', and a circular boss located on one side of the second rotor assembly 22' is referred to as a second circular boss 83'. Further, the step surface 84' can be arranged on the inner side wall of one of the circular bosses, as shown in FIG. 13, so that the structure of the casing 8' is further simplified.

Further, as shown in FIGS. 8 and 9, the motor 100' further comprises an electric control plate 9' internally arranged between the rotor assembly on any side of the motor 100' and the end packaging cover.

Due to the arrangement of the electric control plate 9', automatic control of the motor 100' is facilitated; and the electric control plate 9' is arranged on any side of the motor 100' and positioned between the rotor assembly on the side and the end packaging cover, so that the stability of the electric control plate 9' is guaranteed, and the circuit output of the electric control plate 9' is facilitated.

Figure 15:
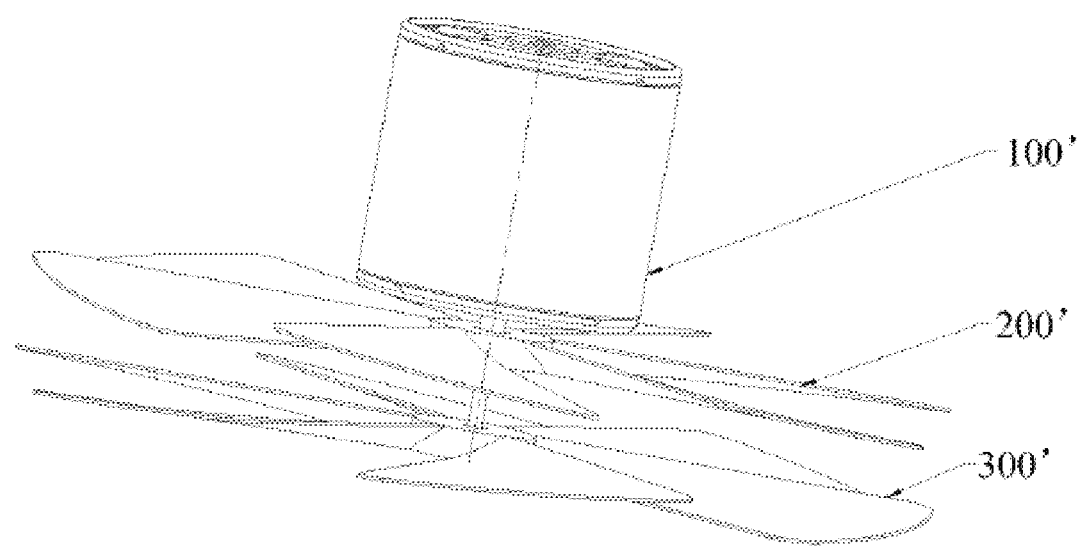
FIG. 15 is a schematic view showing a structure of a fan according to some embodiments of the present disclosure.

As shown in FIG. 15, an embodiment of the second aspect of the present disclosure provides a fan, comprising: at least one motor 100' according to any one of the embodiments of the first aspect; and two fans fixedly connected with the two rotating shaft assemblies of the motor 100' respectively, wherein the two fans rotate coaxially and independently.

Due to the fact that the fan provided by the embodiment of the second aspect of the present disclosure comprises the motor 100' in any one of the embodiments of the first aspect, the fan has the remarkable advantages of compact structure, strong practical functionality, convenient installation, small axial size, low manufacturing cost and the like.

Here, a fan connected with the first rotating shaft assembly 31' is referred to as a first fan 100', and a fan connected with the second rotating shaft assembly 32' is referred to as a second fan 300'.

In this description, the extension direction of the central axis in FIG. 8 is simply referred to as "axial direction", the direction around the central axis is simply referred to as "circumferential direction", and the direction perpendicular to the central axis is simply referred to as "radial direction".

The motor 100' and the fan provided by the present disclosure are described below in connection with a specific example.

As shown in FIGS. 8 to 15, a motor 100' includes a stator assembly 1, two rotor assemblies (i.e., a first rotor assembly 21' and a second rotor assembly 22'), and two shaft assemblies (i.e., a first rotating shaft assembly 31' and a second rotating shaft assembly 32').

In particular, the stator assembly 1' comprises a stator core 11' and two groups of windings (i.e., a first winding 121' and a second winding 122'). The stator core 11' is formed by connecting a stator yoke portion 111' and a plurality of removable stator teeth 112' into an integrated structure that is radially hollow and has axially extending teeth, and the stator radial hollow provides an advantageous axial mounting space for the bearings of the motor 100'. The first winding 121' and the second winding 122' are respectively wound on the stator tooth bodies 1123' on the two axial sides of the stator, and the first winding 121' and the second winding 122' can act independently of each other on the motor 100'.

A plurality of rabbets (i.e., clamping slots 1111') are formed on the radial outer side of the stator yoke portion 111' and used for matching and installation of the stator tooth portion 112'; and a circular hole groove (i.e., a through hole 1112') is formed on the radial inner side of the stator yoke portion 111' for partially or completely receiving the first rotational support 312' of the first rotating shaft assembly 31' and the second rotational support 322' of the second rotating shaft assembly 32'.

The single stator tooth portion 112' is provided with at least one tooth body 1123' and at least one tooth surface 1121'. After the plurality of stator tooth portions 112' are matched and installed with the stator yoke portion 111', two groups of tooth bodies 1123' and two groups of tooth surfaces 1121' are arranged on the two axial sides of the stator yoke portion 111', and one group of tooth surfaces 1121' which act with the same rotor assembly are in one plane and perpendicular to the axis; and a limit step 1122' is provided on a surface on which the stator tooth portion 112' is matched and installed with the stator yoke portion 111' for abutting against an axial end face of the stator yoke portion 111' to define an axial relative position of the stator tooth portion 112' and the stator yoke portion 111'.

The first rotor assembly 21' and the second rotor assembly 22' are oppositely and coaxially disposed axially outsides two axial sides of the stator assembly 1' to form an axial air gap with the stator assembly 1'. The first rotor assembly 21' comprises a first rotor disk 211' and a first permanent magnet 212', the second rotor assembly 22' comprises a second rotor disk 221' and a second permanent magnet 222', and the first rotor assembly 21' and the second rotor assembly 22' can rotate independently of each other.

The first rotor disk 211' and the second rotor disk 221' are generally identical in structure, and one of the rotor disks is illustrated as an example. The radial outer side of the rotor disk is of a disc-shaped structure, and the radial inner side of the rotor disk is of a disc-shaped plane or conical inclined plane structure, providing a favorable space for installation of other parts.

The radial outer side of the rotor disk is of a disc-shaped structure, and is fixedly connected with a corresponding rotating shaft in a threaded connection mode.

The first permanent magnet 212' and the second permanent magnet 222' are of a circular or fan-shaped pie structure and are uniformly distributed on the axial surface of the rotor disk disc-shaped structure in the circumferential direction to form axial magnetic flux; and N and S poles of two adjacent permanent magnets are alternately arranged or arranged in a Halbach array.

The first rotating shaft assembly 31' and the second rotating shaft assembly 32' are coaxially and fixedly connected with the first rotor assembly 21' and the second rotor assembly 22', respectively, and output coaxially from the same axial side of the motor 100', and the first rotating shaft assembly 31' and the second rotating shaft assembly 32' can rotate independently of each other. The first rotating shaft assembly 31' comprises a solid shaft and two bearings, wherein the two bearings are coaxially arranged on the radial outer side of the solid shaft and are respectively disposed on the two axial sides of the solid shaft which is fixedly connected with the first rotor assembly 31 to form a first rotational support 312'; and the second rotating shaft assembly 32' comprises a hollow shaft and two bearings coaxially disposed at the radial outer side of the hollow shaft and respectively disposed on the two axial sides of the hollow shaft which is fixedly connected to the second rotor assembly 32 to form a second rotational support 322'. The first rotational support 312' of the first rotating shaft assembly 31' and the second rotational support 322' of the second rotating shaft assembly 32' are disposed at the two axial sides of the motor 100', and are partially or completely received in the radial hollow of the stator assembly 1'.

The motor 100' further comprises two bearing covers (i.e., a first bearing cover 41' and a second bearing cover 42'), the first bearing cover 41' and the second bearing cover 42' are coaxially and fixedly connected with the stator assembly 1' and are oppositely provided, with outward openings, in a circular hole groove of the stator yoke portion 111' for supporting the bearings of the first rotating shaft assembly 31' and the second rotating shaft assembly 32' close to the inside of the motor 100'. The first bearing cover 41' and the second bearing cover 42' are thin-walled cylindrical structures, and the first bearing cover 41' is taken as an example to specifically illustrate that an outer wall 411' of the first bearing cover 41' is matched with a radially inner circular groove hole of the stator yoke portion 111', and an inner wall 412' of the first bearing cover 41' is matched with a bearing of the first rotating shaft assembly 31'; and a small flanging 413' is provided radially outside the first bearing cover 41', and a plurality of small notches 414' are uniformly distributed radially on the flanging 413' for rotation stopping and connection.

The motor 100' further comprises a first insulating frame 51' and a second insulating frame 52' mounted on the tooth body 1123' of the stator tooth, a mounting bracket 6' fixedly connected to the first insulating frame 51' or the second insulating frame 52', and a plurality of contact pins 7' inserted on the mounting bracket 6'. Lead-out wires of the first winding 121' and the second winding 122' are each fixedly connected to the plurality of contact pins 7, so that the lead-out wires of the first winding 121' and the second winding 122' are led out to a fixed and stable conductive carrier.

The mounting bracket 6' is of an arc-shaped strip structure coaxial with the stator, and the mounting bracket 6' and the plurality of contact pins 7' are located on the radial outer sides of the first rotor assembly 21' and the second rotor assembly 22'.

The motor 100' further comprises a plastic casing 8' fixedly connecting the stator assembly 1', the first insulating frame 51' and the second insulating frame 52', the mounting bracket 6', the plurality of contact pins 7', the first bearing cover 41' and the second bearing cover 42' to one another to provide an integrated structure. The outer diameter of the plastic casing 8' is greater than the maximum radial outer contour surface formed by the stator assembly 1', the first insulating frame 51', the second insulating frame 52', the mounting bracket 6' and the plurality of contact pins 7'; the wrapping surfaces (i.e., the two axial end faces of the casing 8') of the stator tooth portions 112' on the two axial sides are flush or do not exceed the two groups of tooth surfaces 1121' of the stator assembly 1'; two cylindrical bosses (i.e., circular bosses) coaxial with the stator assembly 1' are provided on the outer sides of the two axial ends of the plastic casing 8'; and the plastic casing 8' is provided with a step surface 84' on the side where the contact pin 7' is located, and the contact pin 7' is exposed out of the step surface 84' by a certain distance, so that a space is provided for connecting or installing the contact pin 7' with other conductive parts.

The motor 100' further comprises a first end packaging cover 101' and a second end packaging cover 102', wherein the first end packaging cover 101' and the second end packaging cover 102' respectively pass through a first rotating shaft 311' and a second rotating shaft 321'; the first end packaging cover 101' and the second end packaging cover 102' are coaxially and fixedly mounted at the two axial ends of the plastic casing 8' for supporting the bearings of the first rotating shaft assembly 31' and the second rotating shaft assembly 32' close to the outer side of the motor 100' and packaging the motor. Taking the second end packaging cover 102' as an example, the outer side of the second end packaging cover 102' is provided with a spigot (i.e., an annular groove 1022') matched with the cylindrical surface boss (i.e., a second circular boss 83') of the plastic casing, and the radial inner side of the second end packaging cover 102' is provided with a bearing chamber 1021' sinking towards the inner side of the body, thereby submerging the bearing into the inner side of the second end packaging cover 102' to reduce the overall axial size of the motor 100'.

The motor 100' may further comprise an electric control plate 9' interposed between the first rotor assembly 21' and the first end packaging cover 101' or between the second rotor assembly 22' and the second end packaging cover 102' on either side of the motor 100'.

The motor 100' may further comprise a support bearing 110' coaxially provided between the output end of the hollow shaft and the solid shaft for increasing the support stiffness of the first rotating shaft assembly 31' and the second rotating shaft assembly 32'.

A fan comprises a motor 100', a first fan 200', and a second fan 300', wherein the first fan 200' and the second fan 300' are coaxially and fixedly connected with the first rotating shaft assembly 31' and the second rotating shaft assembly 32' respectively output on the two sides of the motor 100, and the first fan 200' and the second fan 300' rotate coaxially and independently.

Therefore, the motor and the fan have the remarkable advantages of compact structure, strong practical functionality, convenient installation, small axial size, low manufacturing cost and the like.

Although the present disclosure has the claims that follow, it is also defined by the following clauses.

1. A motor, comprising:
   a stator assembly including a stator core and two groups of mutually independent windings, wherein a hollow channel is arranged in a radial middle part of the stator core, two axial end portions of the stator core are provided with stator teeth protruding towards two axial sides of the stator core, and the two groups of windings are wound on two groups of stator teeth respectively;
   two mutually independent rotor assemblies which are oppositely and coaxially arranged on two axial sides of the stator assembly and form an axial air gap with the stator assembly, wherein the two rotor assemblies are configured to rotate independently; and
   two mutually independent rotating shaft assemblies which are coaxially connected with the two rotor assemblies respectively and protrude in a direction of the same side away from the stator core along the axial direction of the motor, wherein parts of the two rotating shaft assemblies are arranged in the hollow channel.

2. The motor according to clause 1, wherein
   the rotating shaft assembly comprises a rotating shaft, wherein the rotating shaft of one of the rotating shaft assemblies is a hollow shaft, and the rotating shaft of another one of the rotating shaft assemblies extends out through the hollow shaft and is suitable for rotating relative to the hollow shaft.

3. The motor according to clause 2, wherein
the rotating shaft of another one of the rotating shaft assemblies comprises a connecting section and an extending section connected with the connecting section, the outer diameter of the connecting section is equal to the outer diameter of the hollow shaft, the connecting section and the hollow shaft are arranged along the axial direction of the hollow channel, and the extending section extends through the hollow shaft.

4. The motor according to clause 2, further comprising:
a shaft sleeve provided in the hollow channel, and parts of the two rotating shafts are inserted into the shaft sleeve.

5. The motor according to clause 2, further comprising:
a support bearing coaxially provided between an output end portion of the hollow shaft and another one of the rotating shafts.

6. The motor according to any one of clauses 1-5, wherein
the stator core comprises a stator yoke portion and a plurality of stator tooth portions arranged along the circumferential direction of the stator yoke portion, the stator core is formed by assembling the stator tooth portions and the stator yoke portion, the stator tooth portions protrude to two axial sides of the stator yoke portion to form two groups of stator teeth, and the two groups of windings are wound on the stator teeth on the two axial sides of the stator yoke portion respectively.

7. The motor according to clause 6, wherein
the radial middle part of the stator yoke portion is provided with a through hole adapted to the shaft sleeve of the motor, and the through hole forms a part of the hollow channel of the stator core; and/or
a radial outer side wall of the stator yoke portion is provided with a clamping slot, and a part of the stator tooth portion is embedded in the clamping slot, so that the stator tooth portion is in clamping fit with the stator yoke portion.

8. The motor according to clause 7, wherein
any one of the stator tooth portions comprises at least one stator tooth, the stator tooth comprises a tooth body and a tooth surface connected with one axial end of the tooth body and located on one axial side of the stator yoke portion, and all tooth surfaces of any one of the groups of the stator teeth are located in a same plane and are perpendicular to the axis of the stator yoke portion.

9. The motor according to clause 8, wherein
the stator tooth portion comprises two stator teeth, a limit step is arranged on the tooth body of the stator tooth portion and abuts against the stator yoke portion for limiting axial movement of the stator tooth portion with respect to the stator yoke portion 10. The motor according to any one of clauses 1-5, wherein
the rotor assembly comprises a rotor disk coaxially connected with the rotating shaft assembly and a permanent magnet mounted on the rotor disk, and the rotor disk comprises a disc body exterior and a disc body interior connected with the disc body exterior from outside to inside along the radial direction of the rotor disk, wherein the disc body exterior is of a disc-shaped structure, and the disc body interior is of a disc-shaped structure or a cone-shaped structure.

11. The motor according to clause 10, wherein
the rotating shaft assembly comprises a rotating shaft, and the rotor disk is coaxially connected with the rotating shaft; and
the rotor disk and the rotating shaft are of an integrated structure formed by injection molding or welding, or the rotor disk is in threaded connection or interference fit with the rotating shaft.

12. The motor according to clause 10, wherein
the permanent magnet is of a circular or fan-shaped pie structure, the number of the permanent magnets is plural, and the plurality of permanent magnets are uniformly distributed on the axial surface of the rotor disk facing the stator yoke portion circumferentially to form axial magnetic flux; and N poles and S poles of two adjacent permanent magnets are alternately arranged or are arranged in a Halbach array.

13. The motor according to clause 4, wherein
the rotating shaft assembly comprises a rotating shaft and a rotational support, wherein the rotational support is received in the shaft sleeve and is positioned between the shaft sleeve and the rotating shaft for supporting the rotating shaft and enabling the rotating shaft to be suitable for rotating relative to the shaft sleeve, and the rotating shaft is coaxially connected with the rotor assembly.

14. The motor according to clause 13, wherein
the rotational support comprises at least one bearing.

15. The motor according to clause 14, wherein
the number of the bearings is plural, and the plurality of bearings are distributed on the same axial side of the rotor assembly at intervals along a length direction of the rotating shaft.

16. The motor according to clause 15, wherein
an outer side wall of the shaft sleeve is matched with the hollow channel, an inner side wall of the shaft sleeve is matched with the bearing, and the shaft sleeve is matched with the hollow channel by a concave-convex structure to limit the axial movement of the shaft sleeve relative to the stator assembly.

17. The motor according to clause 16, wherein
the concave-convex structure comprises a flange arranged on the outer side wall of the shaft sleeve and a groove arranged on the wall surface of the hollow channel; and the flange is further provided with at least one notch.

18. The motor according to clause 14, wherein
a separation portion is provided on the inner side wall of the shaft sleeve for separating the two rotational supports at intervals.

19. The motor according to any one of clauses 1-5, further comprising:
an insulating frame mounted on the stator teeth;
a mounting bracket fixedly connected to the insulating frame; and
a plurality of contact pins inserted to the mounting bracket, wherein lead-out wires of the two groups of windings are fixedly connected to the plurality of contact pins.

20. The motor according to clause 19, wherein
the mounting bracket is of an arc-shaped strip structure coaxial with the stator assembly, and the mounting bracket and the plurality of contact pins are located on the radial outer side of the rotor assembly.

21. The motor according to clause 19, further comprising:
a casing which is an injection molded body and fixedly connects the insulating frame, the mounting bracket, the plurality of contact pins and the shaft sleeve of the motor to one another to provide an integrated structure, wherein, an outer diameter of the casing is greater than the maximum radial outer contour surface formed by the stator assembly, the insulating frame, the mounting bracket, the plurality of contact pins; and two axial end faces of the casing comprises an inner end face and an outer end face connected with an outer edge of the inner end face, and the outer end face is located on the radial outer side of the inner end face and at least partially protrudes out of the inner end face, so that the two axial end faces of the casing form a stepped structure with high outer height and low inner height, wherein the two inner end faces are flush with the two axial end faces of the stator core or do not exceed the two axial end faces of the stator core.

22. The motor according to clause 21, wherein
two outer end faces of the casing are respectively provided with a circular boss coaxial with the stator assembly.

23. The motor according to clause 21, wherein
a step surface is provided at a position, close to an axial end of the plurality of contact pins, of the casing, and the plurality of contact pins pass through the step surface and protrude out of the step surface along the axial direction of the stator assembly.

24. The motor according to clause 21, further comprising:
two end packaging covers which are coaxially and fixedly mounted at the two axial ends of the casing respectively for packaging the motor and are provided with shaft holes for extending out the rotating shaft assembly.

25. The motor according to clause 24, further comprising:
an electric control plate internally arranged between the rotor assembly on any side of the motor and the end packaging cover.

26. The motor according to clause 4, further comprising:
two shaft sleeve packaging covers which are fixedly connected at axial ports of the shaft sleeves for limiting the axial movement of the rotating shaft assemblies.

27. A fan, comprising:
at least one motor according to any one of clauses 1 to 26;
two fans fixedly connected with the two rotating shaft assemblies of the motor respectively, wherein the two fans rotate coaxially and independently.

28. A motor, comprising:
a stator assembly including a stator core and two groups of mutually independent windings, wherein a hollow channel is arranged in a radial middle part of the stator core, two axial end portions of the stator core are provided with stator teeth protruding towards two axial sides of the stator core, and the two groups of windings are wound on two groups of stator teeth respectively;
two mutually independent rotor assemblies which are oppositely and coaxially arranged on two axial sides of the stator assembly and form an axial air gap with the stator assembly, wherein the two rotor assemblies are configured to rotate independently; and
two mutually independent rotating shaft assemblies including a rotating shaft and a rotational support, wherein the rotational support is at least partially received in the hollow channel and sleeved on the rotating shaft for supporting the rotating shaft and enabling the rotating shaft to be suitable for rotating relative to the stator core, and the two rotating shafts are coaxially connected with the two rotor assemblies respectively and protrude in a direction of the same side away from the stator core along the axial direction of the motor.

29. The motor according to clause 28, wherein
the rotational support comprises at least one bearing.

30. The motor according to clause 29, wherein
the number of the bearings is plural, and the plurality of bearings are distributed on the two axial sides of the corresponding rotor assembly at intervals along the length direction of the rotating shaft.

31. The motor according to clause 30, further comprising:
two bearing covers sleeved in the hollow channel and fixedly connected with the stator core, wherein the two bearing covers are arranged opposite to each other for respectively supporting the bearings axially inwards of the corresponding rotating shaft assemblies.

32. The motor according to clause 31, wherein
the bearing cover is adapted to the shape of the bearing, and the bearing is received in the bearing cover and supported by the bearing cover.

33. The motor according to clause 32, wherein
an open end of the bearing cover is provided with a flanging extending radially outwards.

34. The motor according to clause 33, wherein
the flanging is provided with at least one notch.

35. The motor according to clauses 28-34, wherein
the rotating shaft of one of the rotating shaft assemblies is a hollow shaft, and the rotating shaft of another one of the rotating shaft assemblies extends out through the hollow shaft and is suitable for rotating relative to the hollow shaft.

36. The motor according to clause 35, wherein
the rotating shaft of another one of the rotating shaft assemblies comprises a connecting section and an extending section connected with the connecting section, the outer diameter of the connecting section is equal to the outer diameter of the hollow shaft, the connecting section and the hollow shaft are arranged along the axial direction of the hollow channel, and the extending section extends through the hollow shaft.

37. The motor according to clause 35, further comprising:
a support bearing coaxially provided between an output end portion of the hollow shaft and another one of the rotating shafts.

38. The motor according to clauses 28-34, wherein
the stator core comprises a stator yoke portion and a plurality of stator tooth portions arranged along the circumferential direction of the stator yoke portion, the stator core is formed by assembling the stator tooth portions and the stator yoke portion, the stator tooth portions protrude to two axial sides of the stator yoke portion to form two groups of stator teeth, and the two groups of windings are wound on the stator teeth on the two axial sides of the stator yoke portion respectively.

39. The motor according to clause 38, wherein
the radial middle part of the stator yoke portion is provided with a through hole adapted to the bearing cover of the motor, and the through hole forms a part of the hollow channel of the stator core; and/or
a radial outer side wall of the stator yoke portion is provided with a clamping slot, and a part of the stator tooth portion is embedded in the clamping slot, so that the stator tooth portion is in clamping fit with the stator yoke portion.

40. The motor according to clause 39, wherein
any one of the stator tooth portions comprises at least one stator tooth, the stator tooth comprises a tooth body and a tooth surface connected with one axial end of the tooth body and located on one axial side of the stator yoke portion, and all tooth surfaces of any one of the groups of the stator teeth are located in a same plane and are perpendicular to the axis of the stator yoke portion.

41. The motor according to clause 40, wherein
the stator tooth portion comprises two stator teeth, a limit step is arranged on the tooth body of the stator tooth portion and abuts against the stator yoke portion for limiting axial movement of the stator tooth portion with respect to the stator yoke portion.

42. The motor according to clauses 28-34, wherein
the rotor assembly comprises a rotor disk coaxially connected with the corresponding rotating shaft and a permanent magnet mounted on the rotor disk, and the rotor disk comprises a disc body exterior and a disc body interior connected with the disc body exterior from outside to inside along the radial direction of the rotor disk, wherein the disc body exterior is of a disc-shaped structure, and the disc body interior is of a disc-shaped structure or a cone-shaped structure.

43. The motor according to clause 42, wherein
the rotor disk and the corresponding rotating shaft are of an integrated structure formed by injection molding or welding; or
the rotor disk is in threaded connection or interference fit with the rotating shaft.

44. The motor according to clause 42, wherein
the permanent magnet is of a circular or fan-shaped pie structure, the number of the permanent magnets is plural, and the plurality of permanent magnets are uniformly distributed on the axial surface of the rotor disk facing the stator yoke portion circumferentially to form axial magnetic flux; and N poles and S poles of two adjacent permanent magnets are alternately arranged or are arranged in a Halbach array.

45. The motor according to any one of clauses 28-34, further comprising:
an insulating frame mounted on the stator teeth;
a mounting bracket fixedly connected to the insulating frame; and
a plurality of contact pins inserted to the mounting bracket, wherein lead-out wires of the two groups of windings are fixedly connected to the plurality of contact pins.

46. The motor according to clause 45, wherein
the mounting bracket is of an arc-shaped strip structure coaxial with the stator assembly, and the mounting bracket and the plurality of contact pins are located on the radial outer side of the rotor assembly.

47. The motor according to clause 45, further comprising:
a casing which is an injection molded body and fixedly connects the insulating frame, the mounting bracket, the plurality of contact pins and the two bearing covers of the motor to one another provide an integrated structure, wherein, an outer diameter of the casing is greater than the maximum radial outer contour surface formed by the stator assembly, the insulating frame, the mounting bracket, the plurality of contact pins; and two axial end faces of the casing comprises an inner end face and an outer end face connected with an outer edge of the inner end face, and the outer end face is located on the radial outer side of the inner end face and at least partially protrudes out of the inner end face, so that the two axial end faces of the casing form a stepped structure with high outer height and low inner height, wherein the two inner end faces are flush with the two axial end faces of the stator core or do not exceed the two axial end faces of the stator core.

48. The motor according to clause 47, wherein
a step surface is provided at a position, close to an axial end of the plurality of contact pins, of the casing, and the plurality of contact pins pass through the step surface and protrude out of the step surface along the axial direction of the stator assembly.

49. The motor according to clause 47, further comprising:
two end packaging covers which are coaxially and fixedly mounted at the two axial ends of the casing respectively for packaging the motor and are provided with shaft holes for extending out the corresponding rotating shafts.

50. The motor according to clause 49, wherein
the end packaging cover is provided with a bearing chamber for receiving the corresponding bearings which are axially outward of the rotating shaft assembly.

51. The motor according to clause 49, wherein
two outer end faces of the casing are respectively provided with a circular boss coaxial with the stator assembly, an annular groove is provided at an edge position of the end packaging cover, and the circular boss is embedded into the corresponding annular groove.

52. The motor according to clause 49, further comprising:
an electric control plate internally arranged between the rotor assembly on any side of the motor and the end packaging cover.

53. A fan, comprising:
at least one motor according to any one of clauses 28-52;
two fans fixedly connected with the two rotating shaft assemblies of the motor respectively, wherein the two fans rotate coaxially and independently.

In summary, according to the motor provided by the present disclosure, dual-power independent output of one motor is realized by matching one stator assembly, two mutually independent rotor assemblies and two mutually independent rotating shaft assemblies, and two fans can be driven to independently rotate at respective rotating speeds and directions without interference. Compared with the solution that the two motors are respectively connected with the two fans in a backward axial extension mode, in the present disclosure, at least one stator assembly is omitted, the axial size of the fan is reduced, and the cost of the fan is reduced. Compared with the solution that a single-shaft motor and a gear mechanism are matched to realize the shaft extension at both ends, in the present disclosure, the two fans rotate at any rotating speed and direction, the practical functionality is strong, the diversification of the fan functionality is remarkably improved, the gear mechanism is omitted, and the manufacturing and installation difficulty of products is reduced.

In the present disclosure, the terms "first", "second", "third" are used for descriptive purposes only and are not to be construed as indicating or implying relative importance; the term "plurality" refers to two or more, unless explicitly defined otherwise. The terms "mounted", "connected", "connecting", "fixed", and the like are to be construed broadly, e.g., "connecting" may be a fixed connection, a removable connection, or an integral connection; "connected" may be directly connected or indirectly connected by an intermediary. The specific meaning of the above terms in the present disclosure will be understood in specific circumstances by those of ordinary skill in the art.

In the description of the present disclosure, it should be understood that the directional or positional relationships indicated by the terms "upper", "lower", "left", "right" and the like are based on the directional or positional relationships shown in the drawings. It is merely for the purpose of describing the present disclosure and simplifying the description, and is not intended to indicate or imply that a particular orientation, configuration and operation of the referenced device or unit is required and should not be construed as limiting the present disclosure.

In the description of this description, reference to the terms "an embodiment", "some embodiments", and "a specific embodiment", etc., means that specific features, structures, materials, or characteristics described in connection with the embodiment or example is included in at least one embodiment or example of the present disclosure. In the present specification, schematic statement of the above terms do not necessarily refer to the same embodiment or example. Furthermore, the particular features, structures, materials, or characteristics described may be combined in any suitable manner in any one or more embodiments or examples.

The above mentioned are merely preferred embodiments of the present disclosure and not intended to limit the present disclosure. The present disclosure may have various modifications and changes for those skilled in the art. Any modifications, equivalents, improvements, etc. within the spirit and principles of the present disclosure are intended to be included within the scope of the present disclosure.

What is claimed is:

1. A motor comprising:
a stator assembly, comprising a stator core and two groups of mutually independent windings, wherein a hollow channel is arranged in a radial middle part of the stator core, wherein two axial end portions of the stator core are provided with stator teeth protruding towards two axial sides of the stator core, and wherein the two groups of windings are wound on two groups of stator teeth respectively;
two mutually independent rotor assemblies, being oppositely and coaxially arranged on two axial sides of the stator assembly and forming an axial air gap with the stator assembly, wherein the two rotor assemblies are configured to rotate independently; and
two mutually independent rotating shaft assemblies being coaxially connected with the two rotor assemblies respectively and protruding in a direction of the same side away from the stator core along an axial direction of the motor, wherein parts of the two rotating shaft assemblies are arranged in the hollow channel,
wherein:
a rotating shaft of one of the rotating shaft assemblies is a hollow shaft, and
a rotating shaft of the other one of the rotating shaft assemblies extends out through the hollow shaft and is configured to rotate relative to the hollow shaft, and
wherein:
the rotating shaft of said the other one of the rotating shaft assemblies comprises a connecting section and an extending section connected with the connecting section,
an outer diameter of the connecting section is equal to an outer diameter of the hollow shaft,
the connecting section and the hollow shaft are arranged along the axial direction of the hollow channel, and
the extending section extends through the hollow shaft.

2. The motor according to claim 1, further comprising a support bearing coaxially provided between an output end portion of the hollow shaft and said the other one of the rotating shafts.

3. The motor according to claim 1, further comprising a shaft sleeve provided in the hollow channel, wherein parts of the two rotating shafts are inserted into the shaft sleeve.

4. The motor according to claim 3, wherein:
the rotating shaft assemblies each comprise a rotating shaft and a rotational support,
the rotational support is received in the shaft sleeve and is positioned between the shaft sleeve and the rotating shaft for supporting the rotating shaft and allowing the rotating shaft to rotate relative to the shaft sleeve, and
the rotating shaft is coaxially connected with a respective rotor assembly.

5. The motor according to claim 4, wherein the rotational support comprises at least one bearing.

6. The motor according to claim 5, wherein:
the number of the bearings is plural, and
the plurality of bearings are distributed on the same axial side of the rotor assembly at intervals along a length direction of the rotating shaft.

7. The motor according to claim 6, wherein:
an outer side wall of the shaft sleeve is matched with the hollow channel,
an inner side wall of the shaft sleeve is matched with the bearing, and
the shaft sleeve is matched with the hollow channel by a concave-convex structure to limit the axial movement of the shaft sleeve relative to the stator assembly.

8. The motor according to claim 7, wherein:
the concave-convex structure comprises a flange arranged on the outer side wall of the shaft sleeve and a groove arranged on a wall surface of the hollow channel; and
the flange is further provided with at least one notch.

9. The motor according to claim 4, wherein a separation portion is provided on the inner side wall of the shaft sleeve for separating two rotational supports at intervals.

10. The motor according to claim 3, further comprising two shaft sleeve packaging covers which are fixedly connected at axial ports of the shaft sleeves for limiting the axial movement of the rotating shaft assemblies.

11. The motor according to claim 1, wherein:
the rotating shaft assemblies comprising a rotating shaft and a rotational support,
the rotational support is at least partially received in the hollow channel and sleeved on the rotating shaft for supporting the rotating shaft and allowing the rotating shaft to rotate relative to the stator core, and
the two rotating shafts are coaxially connected with the two rotor assemblies respectively and protrude in a direction of the same side away from the stator core along the axial direction of the motor.

12. The motor according to claim 11, wherein the rotational support comprises at least one bearing.

13. The motor according to claim 12, wherein:
the number of the bearings is plural, and
the plurality of bearings are distributed on two axial sides of corresponding rotor assembly at intervals along the length direction of the rotating shaft.

14. The motor according to claim 13, further comprising two bearing covers sleeved in the hollow channel and fixedly connected with the stator core, wherein the two bearing covers are arranged opposite to each other for respectively supporting the bearings axially inwards of the corresponding rotating shaft assemblies.

15. The motor according to claim 14, wherein the bearing cover is adapted to a shape of the bearing, and the bearing is received in the bearing cover and supported by the bearing cover.

16. The motor according to claim 15, wherein an open end of the bearing cover is provided with a flanging extending radially outwards.

17. The motor according to claim 16, wherein the flanging is provided with at least one notch.

18. The motor according to claim 1, wherein:
the stator core comprises a stator yoke portion and a plurality of stator tooth portions arranged along a circumferential direction of the stator yoke portion,
the stator core is formed by assembling the stator tooth portions and the stator yoke portion,
the stator tooth portions protrude to two axial sides of the stator yoke portion to form two groups of stator teeth, and
the two groups of windings are wound on the stator teeth on the two axial sides of the stator yoke portion respectively.

19. The motor according to claim 18, wherein:
the radial middle part of the stator yoke portion is provided with a through hole adapted to the shaft sleeve of the motor, and the through hole forms a part of the hollow channel of the stator core; and/or
a radial outer side wall of the stator yoke portion is provided with a clamping slot, and a part of each stator tooth portion is embedded in the clamping slot, so that said each stator tooth portion is in clamping fit with the stator yoke portion.

20. The motor according to claim 19, wherein:
each of the stator tooth portions comprises at least one stator tooth,
the at least one stator tooth comprises a tooth body and a tooth surface connected with one axial end of the tooth body and positioned on one axial side of the stator yoke portion, and
tooth surfaces of a group of stator teeth are located in a same plane and are perpendicular to the axis of the stator yoke portion.

21. The motor according to claim 20, wherein:
each stator tooth portion comprises two stator teeth, and
a limit step is arranged on the tooth body of the stator tooth portion and abuts against the stator yoke portion for limiting axial movement of the stator tooth portion with respect to the stator yoke portion.

22. The motor according to claim 1, wherein:
the rotor assemblies each comprise a rotor disk coaxially connected with a respective rotating shaft assembly and a permanent magnet mounted on the rotor disk, and
the rotor disk comprises a disc body exterior and a disc body interior connected with the disc body exterior from outside to inside along a radial direction of the rotor disk, wherein the disc body exterior is of a disc-shaped structure, and the disc body interior is of a disc-shaped structure or a cone-shaped structure.

23. The motor according to claim 22, wherein:
the rotor disk and the rotating shaft of the rotating shaft assembly are of an integrated structure formed by injection molding or welding, or
the rotor disk is in threaded connection or interference fit with the rotating shaft of the rotating shaft assembly.

24. The motor according to claim 22, wherein:
the permanent magnet is of a circular or fan-shaped pie structure;
the number of the permanent magnets is plural, and the plurality of permanent magnets are uniformly distributed on an axial surface of the rotor disk facing the stator yoke portion circumferentially to form axial magnetic flux; and
N poles and S poles of two adjacent permanent magnets are alternately arranged or are arranged in a Halbach array.

25. The motor according to claim 20, further comprising:
an insulating frame, being mounted on the at least one stator tooth;
a mounting bracket, being fixedly connected to the insulating frame; and
a plurality of contact pins, being inserted to the mounting bracket, wherein lead-out wires of the two groups of windings are fixedly connected to the plurality of contact pins.

26. The motor according to claim 25, wherein:
the mounting bracket is of an arc-shaped strip structure coaxial with the stator assembly, and
the mounting bracket and the plurality of contact pins are positioned on the radial outer side of the rotor assemblies.

27. The motor according to claim 25, further comprising:
a casing, being an injection molded body and fixedly connecting the insulating frame, the mounting bracket, the plurality of contact pins and the shaft sleeve of the motor to one another,
wherein:
an outer diameter of the casing is greater than a maximum radial outer contour surface formed by the stator assembly, the insulating frame, the mounting bracket, the plurality of contact pins; and
two axial end faces of the casing comprises an inner end face and an outer end face connected with an outer edge of the inner end face, and the outer end face is located on the radial outer side of the inner end face and at least partially protrudes out of the inner end face, so that the two axial end faces of the casing form a stepped structure with high outer height and low inner height, wherein the two inner end faces are flush with the two axial end faces of the stator core or do not exceed the two axial end faces of the stator core.

28. The motor according to claim 27, wherein two outer end faces of the casing are respectively provided with a circular boss coaxial with the stator assembly.

29. The motor according to claim 27, wherein:
a step surface is provided at a position, close to an axial end of the plurality of contact pins, of the casing, and
the plurality of contact pins pass through the step surface and protrude out of the step surface along the axial direction of the stator assembly.

30. The motor according to claim 27, further comprising two end packaging covers, wherein the two end packaging covers are coaxially and fixedly mounted at the two axial ends of the casing respectively for packaging the motor and are provided with shaft holes for extending out the rotating shaft assembly.

31. The motor according to claim 30, wherein:
an annular groove is provided in an edge position of the end packaging cover, and
circular bosses at the two outer end faces of the casing are embedded into the corresponding annular grooves.

32. The motor according to claim 30, wherein:
when a plurality of bearings of the rotational support of each rotating shaft assembly are distributed on the two axial sides of the rotor assembly at intervals along the length direction of the rotating shaft, the end packaging cover is provided with a bearing chamber for receiving the corresponding bearings which are axially outward of the rotating shaft assembly.

33. The motor according to claim 30, further comprising an electric control plate, being internally arranged between the rotor assemblies on a side of the motor and the end packaging cover.

34. A fan comprising:
at least one motor according to claim 1; and
two fans being fixedly connected with the two rotating shaft assemblies of the motor respectively, wherein the two fans rotate coaxially and independently.

35. A motor comprising:
a stator assembly, comprising a stator core and two groups of mutually independent windings, wherein a hollow channel is arranged in a radial middle part of the stator core, wherein two axial end portions of the stator core are provided with stator teeth protruding towards two axial sides of the stator core, and wherein the two groups of windings are wound on two groups of stator teeth respectively;
two mutually independent rotor assemblies, being oppositely and coaxially arranged on two axial sides of the stator assembly and forming an axial air gap with the stator assembly, wherein the two rotor assemblies are configured to rotate independently;
two mutually independent rotating shaft assemblies being coaxially connected with the two rotor assemblies respectively and protruding in a direction of the same side away from the stator core along an axial direction of the motor, wherein parts of the two rotating shaft assemblies are arranged in the hollow channel;
an insulating frame, being mounted on at least one stator tooth;
a mounting bracket, being fixedly connected to the insulating frame; and
a plurality of contact pins, being inserted to the mounting bracket,
wherein lead-out wires of the two groups of windings are fixedly connected to the plurality of contact pins,
wherein the mounting bracket is of an arc-shaped strip structure coaxial with the stator assembly, and
wherein the mounting bracket and the plurality of contact pins are positioned on the radial outer side of the rotor assemblies.

\* \* \* \* \*